US008497672B2

(12) United States Patent
Kawakubo et al.

(10) Patent No.: US 8,497,672 B2
(45) Date of Patent: Jul. 30, 2013

(54) ACCELERATION SENSOR

(75) Inventors: Takashi Kawakubo, Kanagawa (JP);
Toshihiko Nagano, Kanagawa (JP);
Michihiko Nishigaki, Kanagawa (JP);
Hiroshi Ono, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 435 days.

(21) Appl. No.: 12/881,765

(22) Filed: Sep. 14, 2010

(65) Prior Publication Data
US 2011/0234206 A1    Sep. 29, 2011

(30) Foreign Application Priority Data

Mar. 26, 2010 (JP) ................................. 2010-073696

(51) Int. Cl.
*G01P 15/00* (2006.01)
(52) U.S. Cl.
USPC ........... 324/162; 324/161; 324/163; 324/166; 324/76.41; 73/514.29; 73/488; 73/496; 702/141; 702/142; 702/145
(58) Field of Classification Search
USPC ............ 324/161–163, 166, 76.41; 73/514.29, 73/488–551; 702/141–149
See application file for complete search history.

(56) References Cited

U.S. PATENT DOCUMENTS 7,677,100 B2 * 3/2010 Konaka ....................... 73/504.14
2002/0166379 A1 * 11/2002 Paros et al. ................. 73/504.12

(Continued)

FOREIGN PATENT DOCUMENTS

JP    3-34829    5/1991
JP    06-027137    2/1994

(Continued)

OTHER PUBLICATIONS

Office Action dated Mar. 12, 2012, in Japanese Patent Application No. 2010-073696, filed Mar. 26, 2010 (with English-Language Translation), 7 pages.

(Continued)

*Primary Examiner* — Huy Q Phan
*Assistant Examiner* — Thang Le
(74) *Attorney, Agent, or Firm* — Oblon, Spivak, McClelland, Maier & Neustadt, L.L.P.

(57) ABSTRACT

The present embodiments provide an acceleration sensor, which enables highly accurate detection and has an extremely compact size. The acceleration sensor of the present embodiments is provided with a substrate, a anchor portion formed on the substrate, a support beam, which has one end connected to the anchor portion and extends across a space from the substrate, and a proof mass which is connected to the other end of the support beam and held across a space from the substrate. The acceleration sensor is further provided with first and second piezoelectric bending resonators, a comparison unit, and a calculation unit. The first and second piezoelectric bending resonators have one end connected to the anchor portion and the other end connected to the proof mass or the support beam and have a stack of a first electrode, a first piezoelectric film, and a second electrode. The first and second piezoelectric bending resonators extend on the both sides of the support beam and perform bending resonance motion in a direction perpendicular to the piezoelectric film. The comparison unit measures a difference of a resonance frequency between the first and second piezoelectric bending resonators. The calculation unit calculates an acceleration in a direction perpendicular to the extending direction of the support beam in the substrate surface from the difference of the resonance frequency.

10 Claims, 28 Drawing Sheets

U.S. PATENT DOCUMENTS

| | | | |
|---|---|---|---|
| 2005/0160816 A1* | 7/2005 | Yu | 73/514.29 |
| 2006/0081048 A1* | 4/2006 | Mikado et al. | 73/514.34 |
| 2007/0193355 A1* | 8/2007 | Axelrod et al. | 73/514.32 |
| 2008/0087083 A1 | 4/2008 | Nishizawa et al. | |
| 2009/0255339 A1* | 10/2009 | McNeil et al. | 73/514.15 |
| 2009/0322183 A1 | 12/2009 | Kawakubo et al. | |
| 2010/0064804 A1 | 3/2010 | Kawakubo et al. | |
| 2010/0077858 A1 | 4/2010 | Kawakubo et al. | |

FOREIGN PATENT DOCUMENTS

| | | |
|---|---|---|
| JP | 06-194381 | 7/1994 |
| JP | 07-128358 | 5/1995 |
| JP | 2006-162313 | 6/2006 |
| JP | 2008-209389 | 9/2008 |
| JP | 2009-271029 | 11/2009 |
| WO | 89/10568 | 11/1989 |

OTHER PUBLICATIONS

Office Action dated Oct. 16, 2012, in Japanese Patent Application No. 2010-073696, filed Mar. 26, 2010 (with English-Language Translation), 10 pages.

* cited by examiner

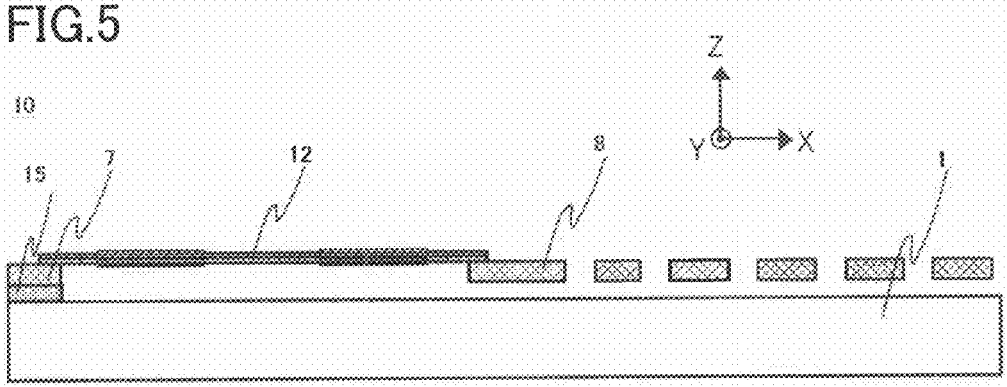

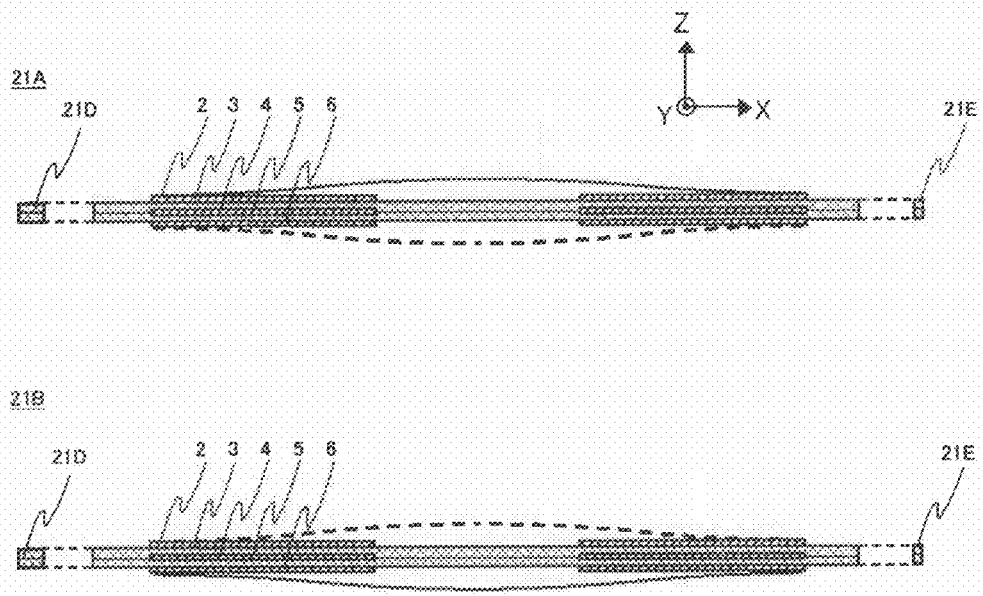
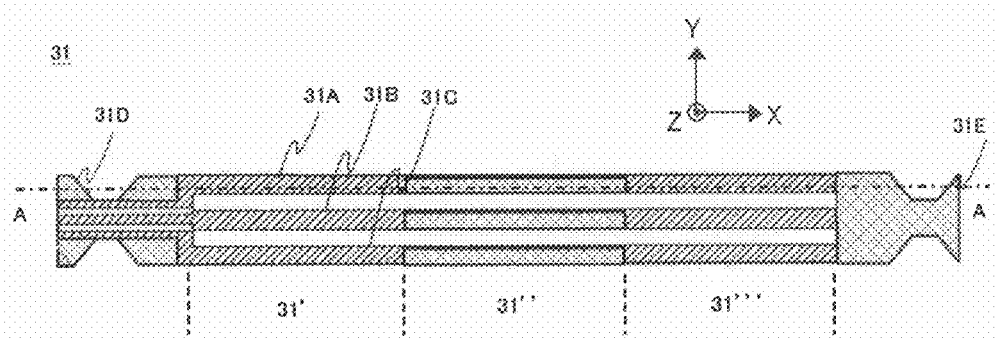

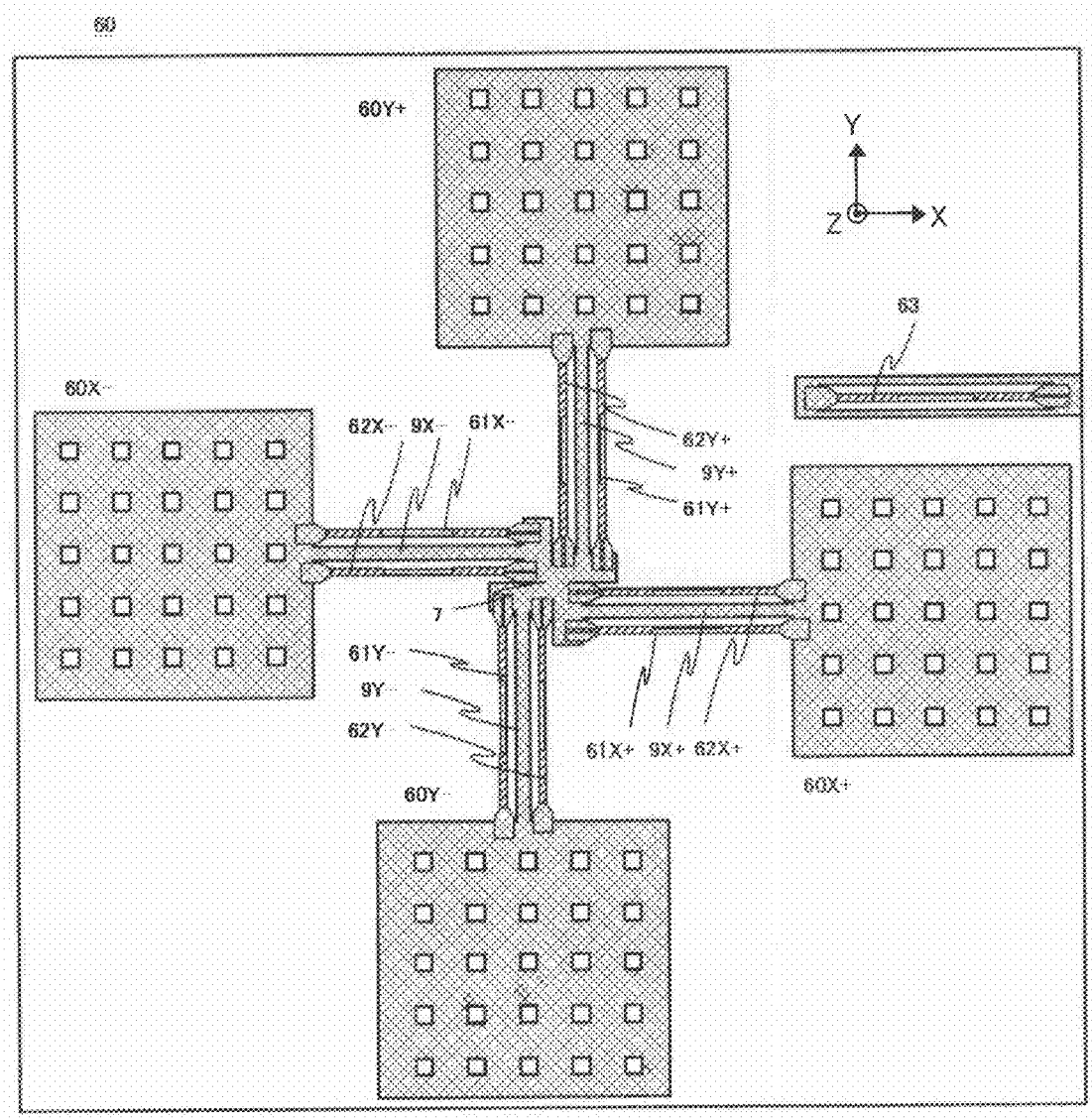

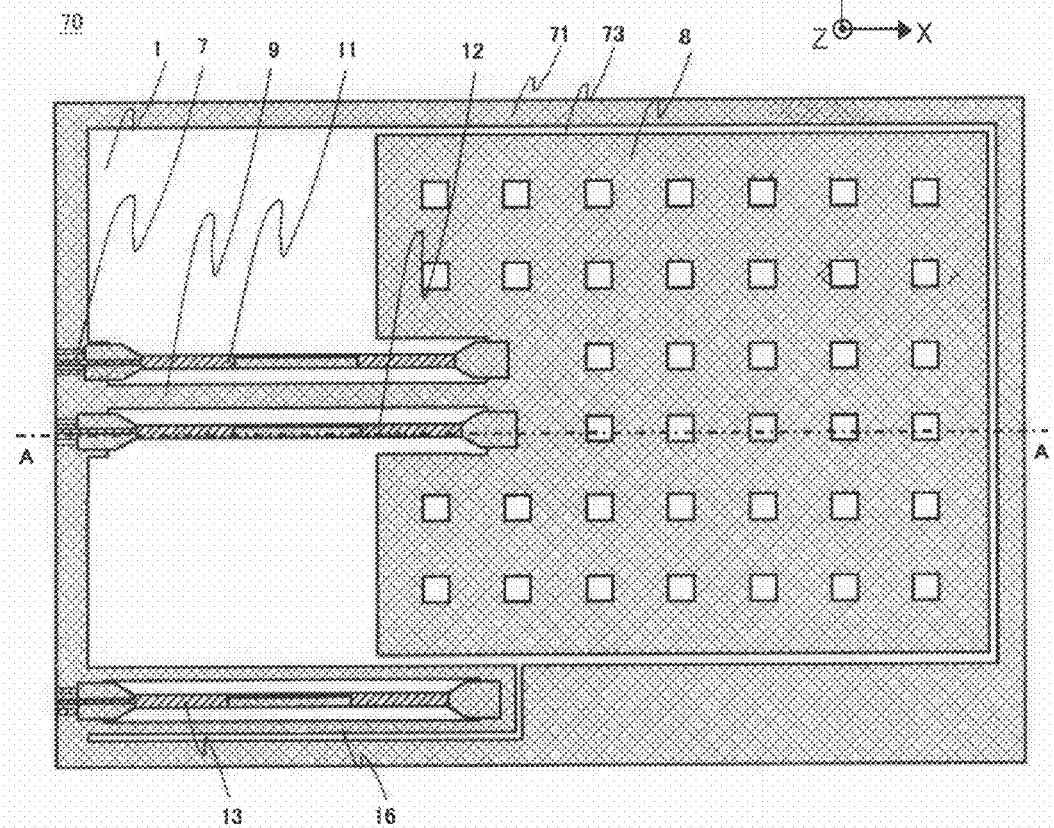
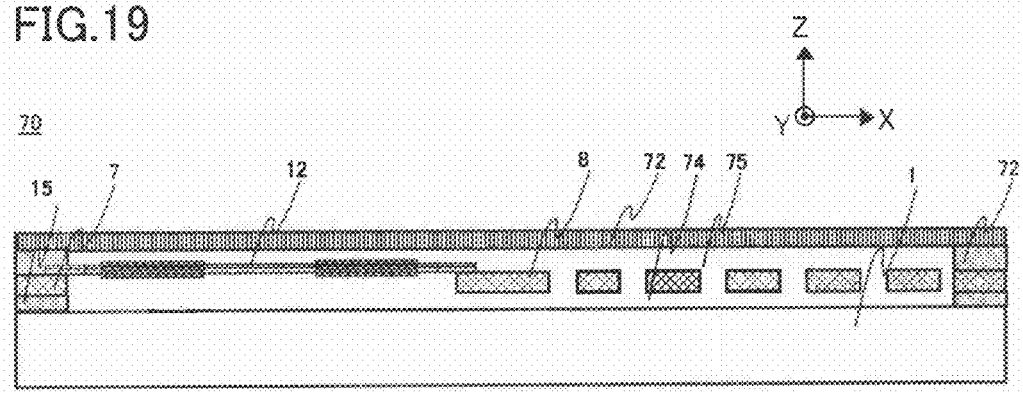

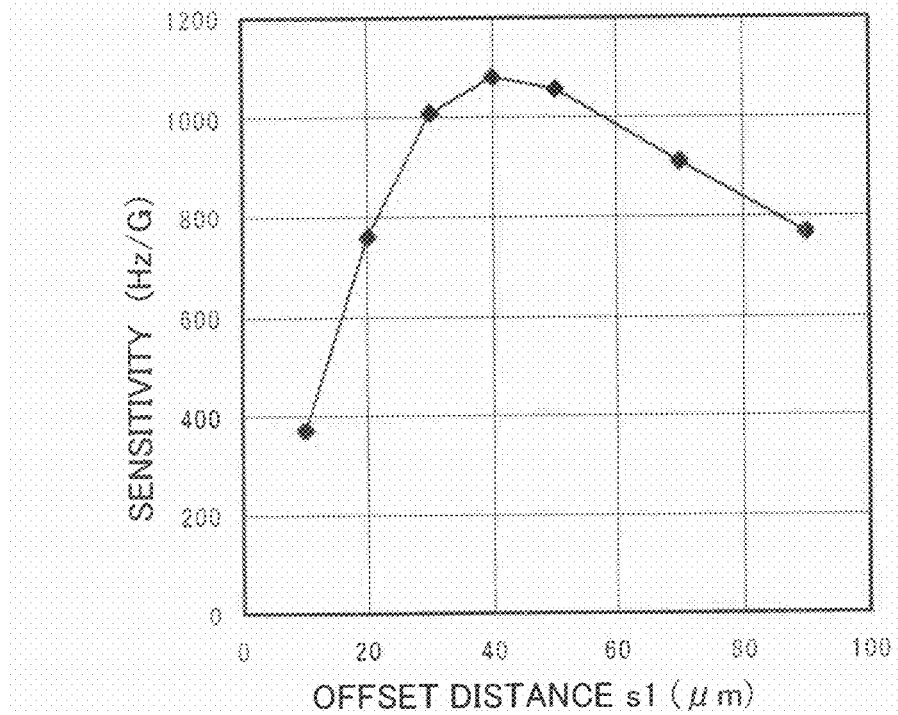

ACCELERATION SENSOR

CROSS-REFERENCE TO RELATED APPLICATION

This application is based upon and claims the benefit of priority from Japanese Patent Application No. 2010-73696, filed on Mar. 26, 2010, the entire contents of which are incorporated herein by reference.

FIELD

Embodiments described herein relate generally to an acceleration sensor.

BACKGROUND

In automobile industry, electrical industry, machine industry, and the like, there is a growing demand for an acceleration sensor (or accelerometer) which can accurately detect an acceleration and an angular velocity. Especially, a small acceleration sensor which can detect the acceleration for each two-dimensional or three-dimensional component is desired.

In order to meet the above demand, there has been proposed an acceleration sensor which has a proof mass having a movable structure and formed on a semiconductor substrate such as a silicon substrate and converts a mechanical distortion, generated in a substrate based on the acceleration applied to the proof mass, into an electrical signal by a sensor based on various conversion principles. As the acceleration sensor, there have been known a sensor utilizing a piezoresistive effect, a sensor utilizing a change of a capacitance, a sensor utilizing a piezoelectric bimorph effect, a sensor utilizing a frequency change of a piezoelectric bending resonator, and the like.

However, the piezoresistive effect has a large temperature dependency, and in order to perform accurate measurement, temperature compensation should be performed. The sensor utilizing a change of a capacitance has an advantage that the manufacturing cost is low. However, since the amount of the formed capacitance is small, it is disadvantageous in that signal processing is difficult. In the sensor utilizing a piezoelectric bimorph effect, it is difficult to detect a static acceleration, and there is a problem that the range of utilization is limited.

The sensor utilizing a frequency change of a piezoelectric bending resonator is known. Namely, the sensor has a constitution that two beam-shaped vibrating arm portions are arranged in a planar manner through a through-hole, and the ends of the two vibrating arm portions are fixed. The vibrating arm portions vibrate in a direction parallel to the plane.

This type of sensor has such characteristics that it has a small temperature-dependency and a high detection sensitivity and can detect the static acceleration. For example, a sensor using a quartz crystal as a material of the piezoelectric bending resonator is proposed; however, there is such a drawback that the size reduction is difficult in manufacturing.

BRIEF DESCRIPTION OF THE DRAWINGS

FIG. 5 is a sectional side view of the acceleration sensor taken along a line A-A of FIG. 4;

FIG. 10 is a sectional side view for explaining an embodiment of vibration in the piezoelectric bending resonator shown in FIG. 8;

FIG. 11 is a top view of a piezoelectric bending resonator constituting an acceleration sensor according to a second variation of the first embodiment;

FIG. 17 is a top view of an acceleration sensor according to a fourth embodiment;

FIG. 18 is a top view of an acceleration sensor according to a fifth embodiment;

FIG. 19 is a sectional side view of the acceleration sensor taken along a line A-A of FIG. 18;

FIG. 49 is a view showing analysis results about sensitivity in the acceleration sensor according to the sixth variation of the first embodiment.

DETAILED DESCRIPTION

Figure 1:
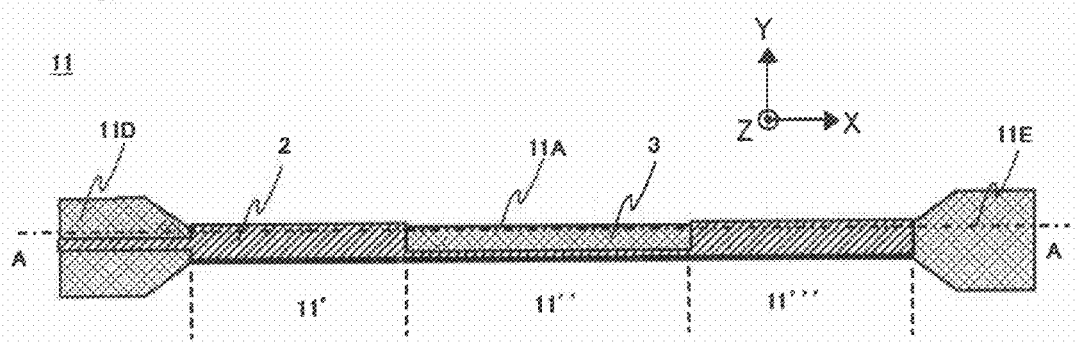
FIG. 1 is a top view of a piezoelectric bending resonator constituting an acceleration sensor according to a first embodiment.

An acceleration sensor according to one embodiment has a anchor portion, a support beams, and a proof mass formed in a planar manner. The anchor portion and the support beam are partially in contact with each other, and the support beam and the proof mass are partially in contact with each other. The acceleration sensor according to the embodiment further has a first and second piezoelectric bending resonators and a third piezoelectric bending resonator for reference. The first and second piezoelectric bending resonators have one end connected to the upper surface of the anchor portion and the other end connected to the upper surface of the proof mass, have a piezoelectric film held between first and second electrodes, and are formed adjacent and in parallel to each other on the both sides of the support beam.

An inertia force accompanying acceleration is applied to the proof mass, whereby the proof mass displaces in a direction perpendicular to the support beam. Consequently, distortion is generated in the piezoelectric bending resonator connected to the proof mass, and the resonance frequency of the piezoelectric bending resonator is changed in accordance with the distortion. The acceleration applied in a direction perpendicular to the extending direction of the support beam in the plane causes the difference of the resonance frequency between the first and second piezoelectric bending resonators. The difference of the resonance frequency is detected, whereby the magnitude of the acceleration applied in the direction perpendicular to the extending direction of the support beam in the plane can be measured. The acceleration applied in a direction perpendicular to the plane causes the difference of the resonance frequency between the first and second piezoelectric bending resonators and the third piezoelectric bending resonator for reference. The difference of the resonance frequency is detected, whereby the magnitude of the acceleration perpendicular to a substrate surface can be measured.

The acceleration sensor according to embodiments has a structure in which thin films are stacked on a substrate and can be created by a so-called surface micromachining method. Since the acceleration sensor can be constituted only of a CMOS-compatible material, the existing manufacturing process can be used, and the acceleration sensor has a very small thickness. Since the acceleration sensor is used for measuring the difference of the resonance frequency between the two piezoelectric bending resonators, the accuracy of detecting acceleration is less likely to depend on temperature.

By virtue of a proof mass structure supported by a cantilever, rigidity is high in the extending direction of the cantilever, and a suitable rigidity depending on the size of the proof mass and the magnitude of the length and width of the cantilever can be provided in two directions perpendicular to the cantilever.

When an inertia force applied to the proof mass is measured, there are the following multiple mechanisms contributing to the realization of high sensitivity:

(1) the film thickness of measuring piezoelectric bending resonators for measurement (first and second piezoelectric bending resonators) is rendered smaller than the film thickness of a proof mass portion to thereby increase distortion generated in the measuring piezoelectric bending resonators by the inertia force applied to the proof mass;

(2) the measuring piezoelectric bending resonator is arranged adjacent and in parallel to the support beam of the proof mass, and a force in a lateral direction (direction perpendicular to the support beam in the plane) applied to the proof mass is amplified by the principle of leverage to be transmitted as an axial force of the piezoelectric bending resonator; therefore, distortion is amplified; and (3) a laminate structure comprising an electrode and a piezoelectric film is used as the piezoelectric bending resonator, so that resonance is caused in the film thickness direction, and therefore, a gauge factor proportional to the square of a ratio of the length of the resonator and a film thickness can be easily increased to not less than 1000.

Since acceleration is read as a resonance frequency, the effects of parasitic capacitance and the influence of noise are reduced, and long-distance transmission can be stably performed.

Since a force feedback type of acceleration sensor can be easily constituted, an acceleration sensor with high linearity and high accuracy can be realized.

A plurality of the acceleration sensors are combined on the same substrate, whereby biaxial and triaxial acceleration sensors and biaxial and triaxial angular acceleration sensors can be easily realized.

When an excessive impact is applied to the proof mass, a stopper for preventing damage can be created by the same process.

Hereinafter, the illustrated embodiments will be described in detail.

(First Embodiment)

Figure 2:
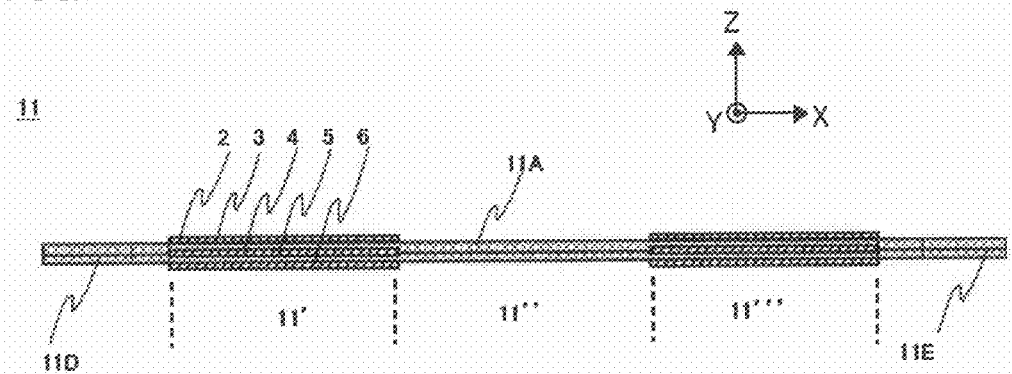
FIG. 2 is a sectional side view of the piezoelectric bending resonator taken along a line A-A of FIG. 1.
Figure 3:
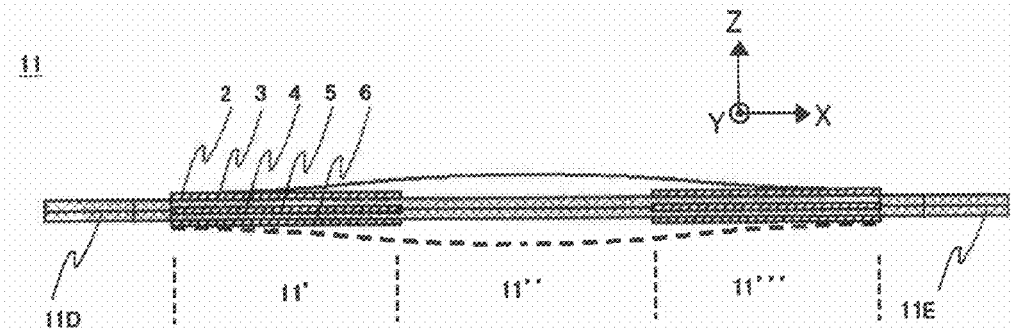
FIG. 3 is a sectional side view for explaining an embodiment of vibration in the piezoelectric bending resonator of FIG. 1.

First, a piezoelectric bending resonator of an acceleration sensor according to a first embodiment will be described. FIG. 1 is a top view of a piezoelectric bending resonator 11 constituting an acceleration sensor 10 (shown in FIG. 4) according to a first embodiment. FIG. 2 is an A-A sectional side view of FIG. 1. FIG. 3 is a sectional side view schematically showing the bending deformation. The extending direction of the piezoelectric bending resonator 11 is an X direction, a direction perpendicular to the X direction in a substrate surface provided with a piezoelectric bending resonator is a Y direction, and a direction perpendicular to the substrate surface is a Z direction.

The piezoelectric bending resonator defined herein is a resonator driven by the piezoelectric effect and having a vibrating beam which is held at the both ends and can perform bending vibration. The piezoelectric bending resonator 11 according to the present embodiment is an example of a piezoelectric bending resonator having one vibrating beam which can perform bending vibration in the direction perpendicular to the substrate surface. As described later, a similar resonator having two or more vibrating beams may be called a dual tuning fork or DETF (Double-Ended Tuning Fork).

The piezoelectric bending resonator 11 has a single vibrating beam 11A having both ends connected to first and second support ends 11D and 11E. The vibrating beam 11A is constituted of an upper electrode (a first electrode) 2, an upper piezoelectric film (a first piezoelectric film) 3, an intermediate electrode (a second electrode) 4, a lower piezoelectric film (a fourth piezoelectric film) 5, and a lower electrode (a seventh piezoelectric film) 6 and thus has a so-called symmetric bimorph structure. The upper piezoelectric film 3 and the lower piezoelectric film 5 are singly polarized in the Z direction.

The vibrating beam 11A of the piezoelectric bending resonator 11 is divided into first to third portions 11', 11'', and 11''' from the first support end 11D to the second support end 11E. In the first and third portion 11' and 11''', the upper, intermediate, lower electrodes 2, 4, and 6 are formed on the entire surface. In the second portion 11'', the second portion has only a wiring portion for connecting the first and third portion 11' and 11'''.

When a positive voltage is applied to between the upper and lower electrodes 2 and 6 and the intermediate electrode 4, in the first and third portion 11' and 11''', the upper piezoelectric film 3 contracts in the X-axis direction, and the lower piezoelectric film 5 expands in the X-axis direction. Therefore, the first and third portion 11' and 11''' project in the −Z direction. One end of the first portion 11' is fixed to the first support end 11D, and one end of the third portion 11''' is fixed to the second support end 11E. Therefore, the first and third portion 11' and 11''' project in the −Z direction, whereby the second portion 11'' is pushed out in the +Z direction. Namely, as shown by the solid line of the deformation diagram of FIG. 3, the vibrating beam 11A bends in the +Z direction. Meanwhile, when a negative voltage is applied to between the upper and lower electrodes 2 and 6 and the intermediate electrode 4, the vibrating beam 11A bends in the −Z direction as shown by the dashed line of the deformation diagram of FIG. 3. Thus, if an alternate voltage is applied to between the upper and lower electrodes 2 and 6 and the intermediate electrode 4, vibration is generated. When the frequency of the alternate voltage is equal to a resonance frequency of the piezoelectric bending resonator, a maximum amplitude is obtained.

In the piezoelectric bending resonator, it is noted that when a stress is applied in the X-axis direction, the resonance frequency changes. A resonance frequency fr is represented by the following formula (1):

$$f_r = 1.02 \frac{t}{L^2} \left(\frac{E}{\rho}\right)^{\frac{1}{2}} \left(1 + 0.24\left(\frac{L}{t}\right)^2 \varepsilon\right)^{\frac{1}{2}} \quad (1)$$

where t is a vibrating beam thickness, L is a vibrating beam length, E is an elastic modulus, ρ is a ratio, and ε is a load.

Since the resonance frequency is significantly changed by distortion, it is possible to know the magnitude of the distortion with high sensitivity by measuring the resonance frequency.

A gauge factor (G.F.) defined by the ratio of the rate of change of the resonance frequency and the rate of change of distortion is approximately represented by the following formula (2):

$$G.F.=0.12(L/t)^2 \quad (2)$$

Namely, since the gauge factor is proportional to approximately the square of the aspect ratio that is the ratio of the vibrating beam length L and the vibrating beam thickness t, it is preferable in terms of realizing high sensitivity that the vibrating beam length is as long as possible and the vibrating beam thickness is as thin as possible. In the present embodiment, an electrode and a piezoelectric film are stacked to form the piezoelectric bending resonator, and consequently it is possible to easily form the piezoelectric bending resonator with a large aspect ratio of the resonator, that is, with very high sensitivity. For example, when the piezoelectric bending resonator has a length of 100 μm and a thickness of 0.3 μm, the gauge factor reaches 13000. In a semiconductor distortion gauge (also called a piezoresistive element) commonly used as a distortion sensor in the acceleration sensor, considering that the gauge factor is approximately 40, it can be shown that a piezoelectric bending detector according to the present embodiment has a very large sensitivity as a detection element for the acceleration sensor.

Figure 4:
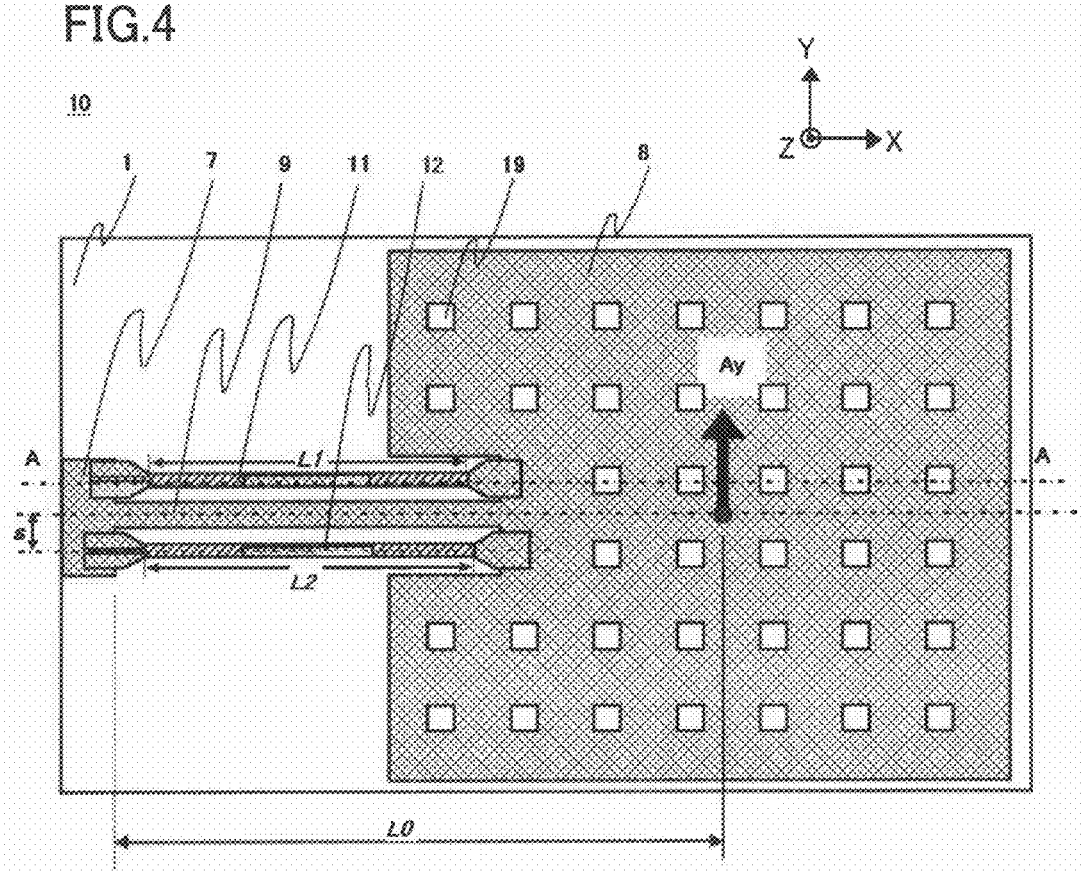
FIG. 4 is a top view of the acceleration sensor according to the first embodiment.

Next, FIG. 4 is a top view of the entire acceleration sensor 10 detecting acceleration in the first embodiment, and FIG. 5 is an A-A sectional side view of FIG. 4.

The acceleration sensor 10 is constituted of a anchor portion 7, a support beam 9, and a proof mass 8 integrally provided on the substrate 1 in a planar manner. The anchor portion 7 is provided on the substrate 1 through a connecting portion 15. The proof mass 8 has punch holes 19 for use in punching a sacrifice layer. The anchor portion 7, the support beam 9, and the proof mass 8 can be created by a flat and stable film such as an SOI layer, and the film thickness can be arbitrarily selected from not more than 1 μm to approximately several ten μm.

The first and second piezoelectric bending resonators 11 and 12 are formed in parallel on the both sides of the support beam 9. The respective one ends of the piezoelectric bending resonators 11 and 12 are connected to the upper surface of the anchor portion 7, and the other ends are connected to the upper surface of the proof mass 8.

The first and second piezoelectric bending resonators 11 and 12 are exactly the same except that lengths L1 and L2 of the vibrating beams are slightly different from each other. This is because it prevents the resonances of the first and second piezoelectric bending resonators 11 and 12 from being coupled to have the same resonance frequency.

Here, the case in which the acceleration in the Y-axis direction is applied to the acceleration sensor 10 is considered. By virtue of the acceleration in the Y-axis direction, an inertia force Ay in the Y-axis direction acts on the proof mass 8, and the support beam 9 bends in the Y-axis direction around the anchor portion 7, whereby a compressive stress is applied to the first piezoelectric bending resonator 11, and a tensile stress acts on the second piezoelectric bending resonator 12. Consequently, the resonance frequency of the first piezoelectric bending resonator 11 is reduced, and the resonance frequency of the second piezoelectric bending resonator 12 is increased. Thus, the difference of the resonance frequency between the first and second piezoelectric bending resonators 11 and 12 is measured, whereby the magnitude of the acceleration applied in the Y direction can be detected.

At that time, when the distance from the anchor portion 7 to the center of gravity of the proof mass 8 is L0, and the distance from the center of the support beam 9 to the center of the piezoelectric bending resonator is s, the inertia force applied to the proof mass 8 is amplified by approximately L0/s by leverage to act on the piezoelectric bending resonator. Thus, the inertia force applied to the proof mass 8 is applied to the piezoelectric bending resonators 11 and 12 with the increasing action of the stress based on the two principles, one of which is the amplifying action because of the difference of the thickness between the proof mass 8 and the piezoelectric bending resonators 11 and 12 and the other of which is the amplifying action because of the principle of leverage. Further, by combining with the very high gauge factor of the piezoelectric bending resonator, it can be shown to have a very high sensitivity.

Meanwhile, when the acceleration in the X axis direction is applied to the acceleration sensor 10, the center of gravity of the proof mass 8 is located on the center line between the first and second piezoelectric bending resonators 11 and 12, and therefore, the tensile stress in the X axis direction is applied approximately equally to the first and second piezoelectric bending resonators 11 and 12. Thus, the changes of the resonances frequencies of the first and second piezoelectric bending resonators 11 and 12 at that time are equal, and the frequency difference between the first and second piezoelectric bending resonators 11 and 12 does not occur. Namely, no sensitivity is provided for the acceleration in the X-axis direction.

Meanwhile, when the acceleration in the Z-axis direction is applied to the acceleration sensor 10, the force in the Z-axis direction acts on the proof mass 8, and the centers of the film thicknesses of the first and second piezoelectric bending resonators 11 and 12 deviate from the center of the film thicknesses of the support beam 9. Therefore, although the compressive stress in the X-axis direction is applied to the first and second piezoelectric bending resonators 11 and 12, the changes of the resonances frequencies of the first and second piezoelectric bending resonators 11 and 12 are equal, and therefore, change does not occur when the difference between the two is taken. Namely, no sensitivity is provided for the acceleration in the Z-axis direction.

When temperature change occurs in the acceleration sensor 10, a thermal stress is applied to the first and second piezoelectric bending resonators 11 and 12 according to a difference between a thermal expansion coefficient of the support beam 9 and thermal expansion coefficients of the first and second piezoelectric bending resonators 11 and 12, and the resonance frequency changes. However, the first and second piezoelectric bending resonators 11 and 12 are disposed axisymmetrically with respect to the central axis of the support beam 9, so that the changes of the resonance frequencies of the two are equal, and therefore, change does not occur when the difference between the two is taken. Namely, no sensitivity is provided for temperature change.

As described above, in the acceleration sensor 10 detecting acceleration in the first embodiment, it is possible to realize such an acceleration sensor detecting a single-axis acceleration, which has a very high sensitivity of the acceleration only in the Y-axis direction, has no sensitivity in the X-axis and Z-axis directions, and has no sensitivity for temperature change.

The proof mass 8, the support beam 9, and the anchor portion 7 are preferably formed of a film with stability and good flatness such as an SOI film formed of single-crystal silicon and a polysilicon film from which a remaining stress is removed by annealing at a sufficiently high temperature.

The upper piezoelectric film 3 and the lower piezoelectric film 5 are preferably piezoelectric films having a good affinity to a silicon process and a good piezoelectricity, and particularly preferred are aluminum nitride (AlN) and zinc oxide (ZnO), which have a high Q value when they are resonated. A ferroelectric substance such as lead zirconate titanate (PZT) may be used.

The upper electrode 2, the intermediate electrode 4, and the lower electrode 6 may be formed of a material used in a general LSI wiring, such as aluminum (Al), copper (Cu), titanium (Ti), molybdenum (Mo), and tungsten (W).

FIG. 6 shows a process sequence sectional side view of the acceleration sensor according to the first embodiment when an SOI substrate is used (A-A cross-section of FIG. 4).

Figure 6A:
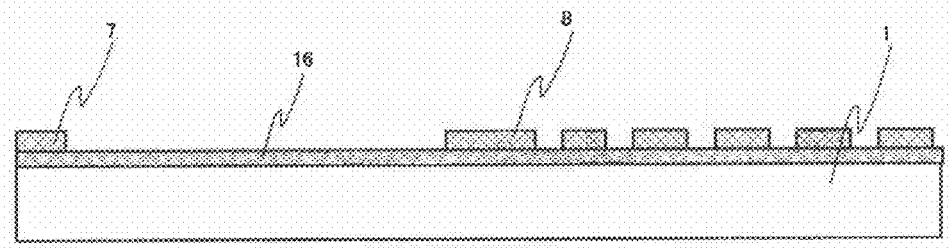
FIGS. 6A to 6D are process sequence sectional side views of the acceleration sensor according to the first embodiment.

As shown in FIG. 6A, an SOI layer on the SOI substrate 1 is processed by known lithography and etching to form the anchor portion 7, the support beam 9 (not shown), and the proof mass 8. The lower portion of the SOI layer has a buried oxide film layer as a first sacrifice layer 16.

Figure 6B:
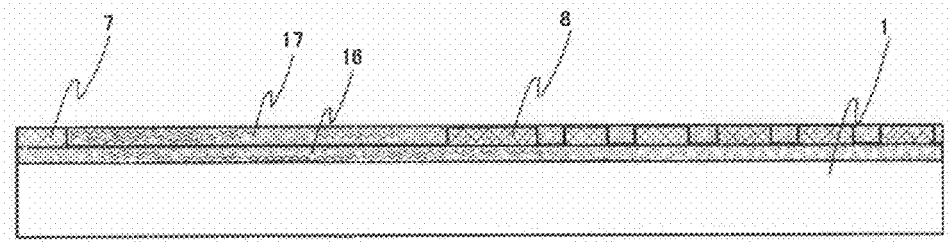

Next, as shown in FIG. 6B, a second sacrifice layer 17 is formed on the entire surface of the substrate 1 shown in FIG. 6A to be planarized by chemical mechanical polishing (CMP). As the second sacrifice layer 17, oxide silicon (PSG) doped with phosphorus is used, and film formation is performed by a plasma CVD method. Further, polishing and planarization are performed using chemical mechanical polishing (CMP) until the surface of the proof mass 8 is exposed.

Figure 6C:
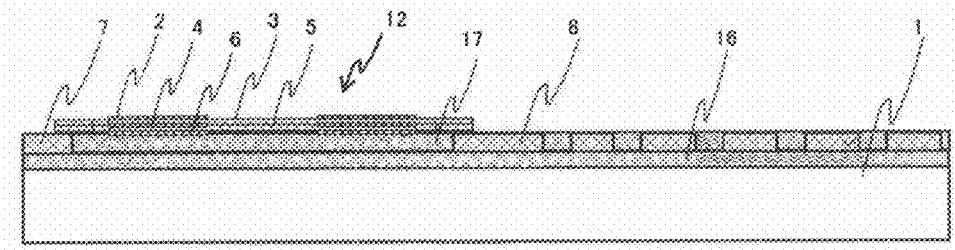

Next, as shown in FIG. 6C, the lower electrode 6 formed of Al, the lower piezoelectric film 5 formed of AlN, the intermediate electrode 4 formed of Al, the upper piezoelectric film 3 formed of AlN, and the upper electrode 2 formed of Al are formed in this order by repeating film formation by sputtering and patterning by lithography and etching, whereby the piezoelectric bending resonators 11 and 12 are created.

Figure 6D:
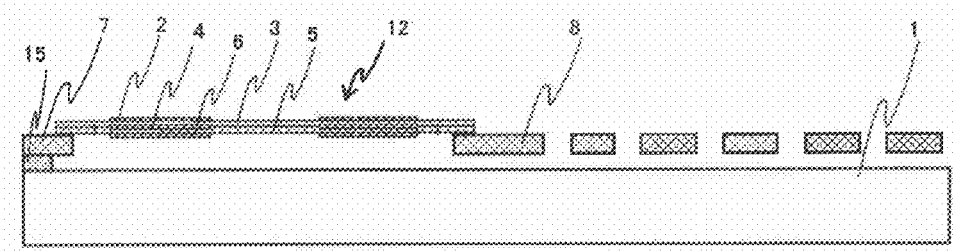

Finally, as shown in FIG. 6D, the first and second sacrifice layers 16 and 17 are removed in hydrofluoric acid vapor, remaining a connection portion 15 with the substrate, and the acceleration sensor 10 extending in the air on the substrate is created.

Figure 7A:
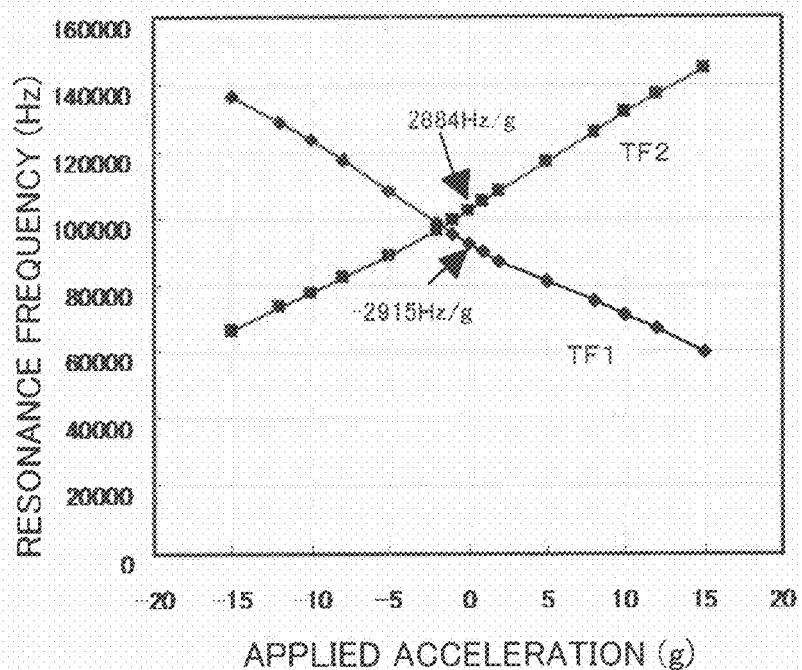
FIG. 7A is a view showing a measurement example of a resonance frequency change with respect to an acceleration in the acceleration sensor according to the first embodiment.

FIG. 7A shows an example of measuring the performance of the obtained acceleration sensor 10 according to the first embodiment. The size of the proof mass 8 is 500×500×15 μm, the size of the support beam 9 is 180×6×15 µm, the size of the piezoelectric bending resonator 11 (TF1) is 180×20×0.3 µm, and the size of the piezoelectric bending resonator 12 (TF2) is 160×20×0.3 µm.

FIG. 7A is a view showing a relationship between the applied acceleration of the acceleration sensor 10 and the resonance frequencies of the piezoelectric bending resonators 11 and 12. As shown in FIG. 7A, in such a state that no acceleration is applied, TF1 has a resonance frequency of about 90 kHz, and TF2 has a resonance frequency of about 100 kHz. However, when the acceleration in the Y direction is applied, the resonance frequency of TF1 is significantly reduced by the compressive stress, and the resonance frequency of TF2 is significantly increased by the tensile stress, whereby such very large frequency change sensitivities of −2915 Hz/g and 2884 Hz/g are obtained.

The aspect ratio of the length of the vibrating beam of TF1 or TF2 to the thickness is not less than 300 times, and, as shown in the formula (2), the gauge factor of the piezoelectric bending resonator reaches not less than 1000, whereby the effect of the ratio of the thickness of the proof mass 8 to the piezoelectric bending resonators 11 and 12 and the effect of leverage are multiplied, and a sensitivity for very large acceleration is obtained.

Figure 7B:
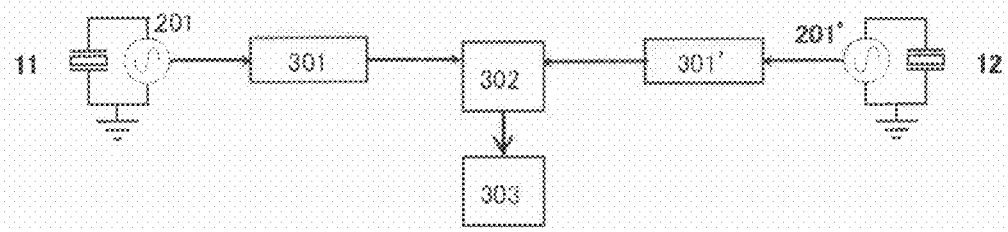
FIG. 7B is a view showing a processing for calculating the acceleration in the acceleration sensor according to the first embodiment.

FIG. 7B is a view showing a processing of calculating the acceleration in the Y-axis direction using the acceleration sensor of the first embodiment. The first and second piezoelectric bending resonators 11 and 12 are connected respectively to oscillating circuits 201 and 201'. The oscillating circuits 201 and 201' are connected respectively to frequency counters 301 and 301'. The frequency counters 301 and 301' are connected to a comparison unit 302. The difference of the frequency between the two frequency counters 301 and 301' is obtained by the comparison unit 302. The comparison unit 302 is connected to a calculation unit 303. In the calculation unit 303, the acceleration in the Y direction is calculated from the difference of the frequency between the two piezoelectric bending resonators 11 and 12 (a first value), using the formula (1). According to this constitution, by virtue of the acceleration sensor 10, the acceleration applied to the proof mass 8 and in the direction parallel to the surface of the substrate 1 and perpendicular to the extending direction of the support beam 9 can be detected.

(First Variation of First Embodiment)

The piezoelectric bending resonators 11 and 12, which constitute the acceleration sensor 10 detecting acceleration in the first embodiment, are piezoelectric bending resonators having one vibrating beam capable of performing bending vibration in a direction perpendicular to a piezoelectric film surface (hereinafter referred to as a film surface). Meanwhile, a first variation of the first embodiment uses a piezoelectric bending resonator having two vibrating beams capable of performing bending vibration in the direction perpendicular to the film surface. Since the entire constitution of the acceleration sensor except for the piezoelectric bending resonator is similar to that of the first embodiment, the details of the entire constitution will be omitted. As described above, this type of bending resonator may be called a dual tuning fork or DETF.

Figure 8:
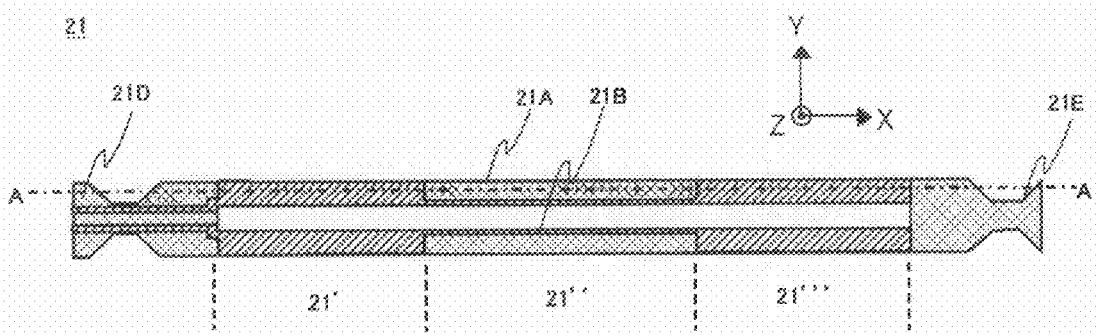
FIG. 8 is a top view of a piezoelectric bending resonator constituting an acceleration sensor according to a first variation of the first embodiment of the present embodiment.
Figure 9:
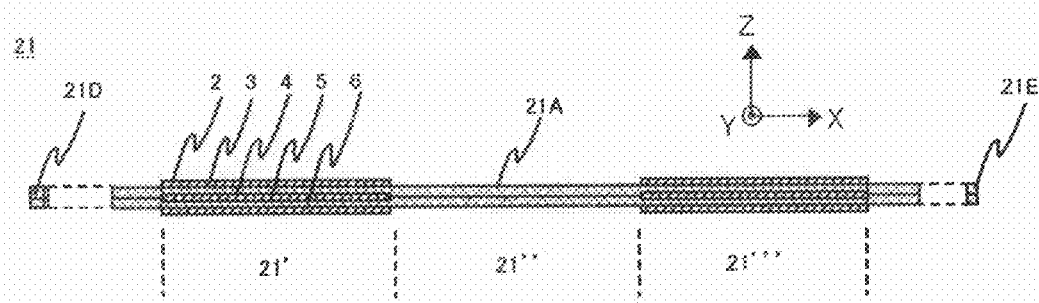
FIG. 9 is a sectional side view of the piezoelectric bending resonator taken along a line A-A of FIG. 8.

FIG. 8 is a top view of a piezoelectric bending resonator 21 according to the first variation of the first embodiment. FIG. 9 is an A-A sectional side view of FIG. 8. FIG. 10 is a sectional side view schematically showing the bending deformation of the piezoelectric bending resonator 21. The extending direction of the piezoelectric bending resonator 21 is the X direction, a direction perpendicular to the X direction in the film surface is the Y direction, and a direction perpendicular to the film surface is the Z direction.

The piezoelectric bending resonator 21 has first and second vibrating beams 21A and 21B having both ends connected to first and second support ends 21D and 21E. The vibrating beams 21A and 21B are each constituted of the upper electrode 2, the upper piezoelectric film 3 singly polarized in the Z direction, the intermediate electrode 4, the lower piezoelectric film 5 singly polarized in the Z direction, and the lower electrode 6.

The vibrating beams 21A and 21B of the piezoelectric bending resonator 21 are divided into first to third portions 21', 21", and 21'" from the first support end 21D to the second support end 21E. With regard to the first vibrating beam 21A, in the first and third portion 21' and 21'", the upper, intermediate, lower electrodes 2, 4, and 6 are formed on the entire surface. In the second portion 21", the upper, intermediate, lower electrodes 2, 4, and 6 have a smaller width for the purpose of connecting the electrodes in the first and third portions 21' and 21'". The second vibrating beam 21B is configured axisymmetrically with respect to the first vibrating beam 21A and the X axis.

In the first vibrating beam 21A, when a positive voltage is applied to the upper electrode 2 and the lower electrode 6 relative to the intermediate electrode 4, the upper piezoelectric film 3 held between the upper electrode 2 and the intermediate electrode 4 contracts in the X-axis direction in the first and third portions 21' and 21'", and the lower piezoelectric film 5 held between the intermediate electrode 4 and the lower electrode 6 expands in the X-axis direction. Therefore, as shown by the solid line of the deformation diagram of FIG. 10, in the first vibrating beam 21A, the second portion 21" at the center bends in the +Y direction. In the second vibrating beam 21B, a voltage having a polarity reversed to that of the first vibrating beam 21A is applied, the second portion 21" at the center bends in the −Y direction.

Thus, an alternate voltage in positive phase is applied to the first vibrating beam 21A, and an alternate voltage in opposite phase is applied to the second vibrating beam 21B, whereby opposite phase vibration is generated between the first and second vibrating beams 21A and 21B. Since the vibration has an opposite phase, the momentum accompanying the vibrations of the first and second vibrating beams 21A and 21B is substantially offset, and the vibration is confined in the piezoelectric bending resonator 21. Consequently, the Q value is increased, so that measurement accuracy of the resonance frequency can be enhanced. However, a slight amount of torsional vibration components around the X axis remains. When the frequency of the alternate voltage is equal to the resonance frequency of the piezoelectric bending resonator, a maximum amplitude is obtained.

As described above, the piezoelectric bending resonator 21 having the two beams bending in plane is used as a detector of the acceleration sensor, so that the two oscillators 21A and 21B are resonated in opposite phases, whereby the Q value is increased, and advantages such as the enhancement of acceleration detection accuracy can be obtained.

(Second Variation of First Embodiment)

The piezoelectric bending resonator 11 constituting the acceleration sensor 10 detecting acceleration in the first embodiment is a piezoelectric bending resonator having one vibrating beam capable of performing bending vibration in the direction perpendicular to the film surface. Meanwhile, a second variation of the first embodiment uses a piezoelectric bending resonator having three vibrating beams capable of performing bending vibration in the direction perpendicular to the film surface. Since the entire constitution of the acceleration sensor except for the piezoelectric bending resonator is similar to that of the first embodiment, the details of the entire constitution will be omitted.

Figure 12:
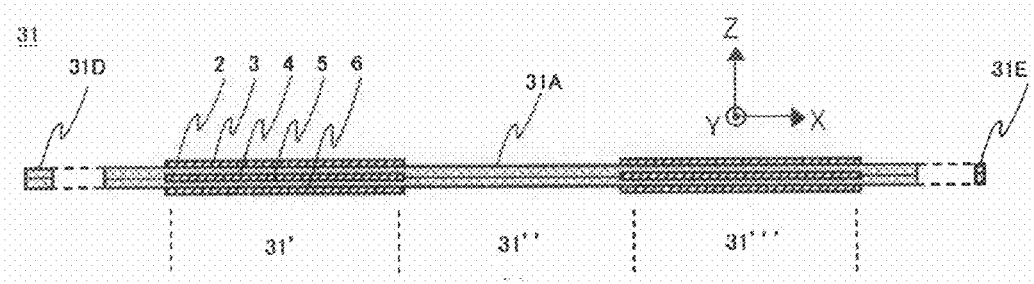
FIG. 12 is a sectional side view of the piezoelectric bending resonator taken along a line A-A of FIG. 11.
Figure 13A:
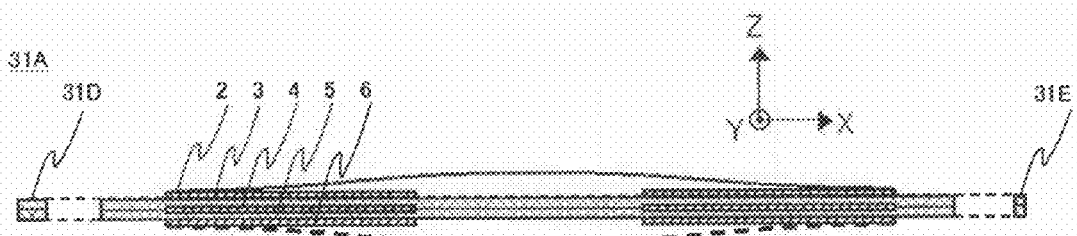
FIGS. 13A to 13C are side views for explaining an embodiment of vibration in the piezoelectric bending resonator shown in FIG. 11.
Figure 13B:
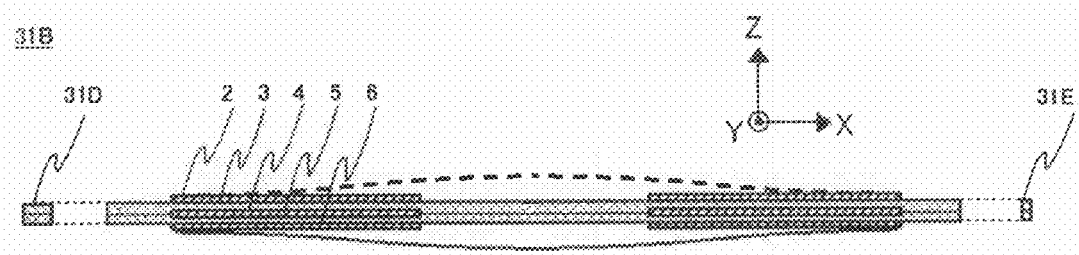
Figure 13C:
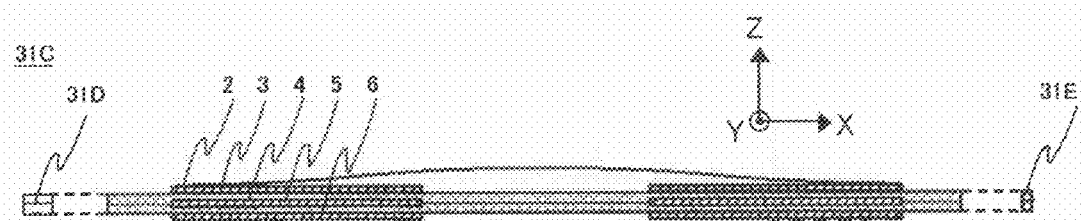

FIG. 11 is a top view of a piezoelectric bending resonator 31 constituting an acceleration sensor 30 detecting acceleration in the second variation of the first embodiment. FIG. 12 is an A-A sectional side view of FIG. 11. FIGS. 13A to 13C are sectional side views schematically showing the bending deformation of the piezoelectric bending resonator 31.

The piezoelectric bending resonator 31 has first to third vibrating beams 31A, 31B, and 31C having both ends connected to first and second support ends 31D and 31E. The vibrating beams 31A to 31C are each constituted of the upper electrode 2, the upper piezoelectric film 3 singly polarized in the Z direction, the intermediate electrode 4, the lower piezoelectric film 5 singly polarized in the Z direction, and the lower electrode 6.

The vibrating beams 31A to 31C of the piezoelectric bending resonator 31 are divided into first to third portions 31', 31", and 31'" from the first support end 31D to the second support end 31E. With regard to the first vibrating beam 31A, in the first and third portion 31' and 31'", the upper, intermediate, lower electrodes 2, 4, and 6 are formed on the entire surface. In the second portion 31", the upper, intermediate, lower electrodes 2, 4, and 6 have a smaller width for the purpose of connecting the electrodes in the first and third portions 31' and 31'". The second and third vibrating beams 31B and 31C have the same shape as that of the first vibrating beam 31A and are formed adjacent and in parallel to each other.

In the first and third vibrating beams 31A and 31C, when a positive voltage is applied to the upper electrode 2 and the lower electrode 6 relative to the intermediate electrode 4, the upper piezoelectric film 3 held between the upper electrode 2 and the intermediate electrode 4 contracts in the X-axis direction in the first and third portions 31' and 31'", and the lower piezoelectric film 5 held between the intermediate electrode 4 and the lower electrode 6 expands in the X-axis direction. Therefore, as shown by the solid lines of the deformation diagrams of FIGS. 13A, 13B, and 13C, in the first and third vibrating beams 31A and 31C, the second portion 31" at the center bends in the +Y direction. In the second vibrating beam 31B, a voltage having a polarity reversed to that of the first vibrating beam 31A is applied, and the second portion 31" at the center bends in the −Y direction.

Thus, an alternate voltage in positive phase is applied to the first and third vibrating beams 31A and 31C, and an alternate voltage in opposite phase is applied to the second vibrating beam 31B, whereby opposite phase vibration is generated between the first and third vibrating beams 31A and 31C and the second vibrating beam 31B. Since the vibration has an opposite phase, all momenta accompanying the vibrations of the first and third vibrating beams 31A and 31C and the second vibrating beam 31B are offset, and the vibration is completely confined in the piezoelectric bending resonator 31. Consequently, the Q value is increased, so that the measurement accuracy of the resonance frequency can be enhanced.

When the first to third vibrating beams 31A to 31C have the same width, the momenta are offset dynamically, and therefore, the amplitude of the second vibrating beam 31B is twice the amplitude of the first or third vibrating beam 31A or 31C. If the width of the second vibrating beam 31B is twice the width of the first or third vibrating beam 31A or 31C, all the vibrating beams have the same amplitude. The resonance frequency is slightly amplitude-dependent, and therefore, when the width of the second vibrating beam 31B is twice the width of the first or third vibrating beam 31A or 31C, the Q value is further increased.

As described above, in the second variation of the first embodiment, in comparison with the first embodiment, there is an advantage that the acceleration with higher accuracy can be detected by the piezoelectric bending resonator with a high Q value.

(Third Variation of First Embodiment)

The upper, intermediate, and lower electrodes 2, 4, and 6, which constitute a piezoelectric bending resonator 11 of the acceleration sensor 10 detecting acceleration in the first embodiment, are, as with those shown in FIG. 1, formed on the entire surface in a first portion 11' and a third portion 11'" of a vibrating beam 11A. In a second portion 11", the electrodes have a smaller width because they serve as wirings connecting the electrodes in the first and third portions 11' and 11'". On the other hand, in a third variation of the first embodiment, the upper, intermediate, and lower electrodes 2, 4, and 6 are formed on the entire surface in the second portion 201". Since the entire constitution of the acceleration sensor except for the piezoelectric bending resonator is similar to that of the first embodiment, the details of the entire constitution will be omitted.

Figure 40:
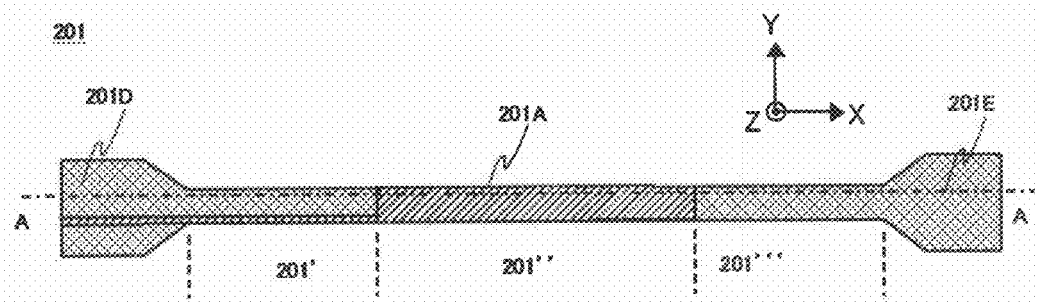
FIG. 40 is a top view of a piezoelectric bending resonator constituting an acceleration sensor according to a third variation of the first embodiment.
Figure 41:
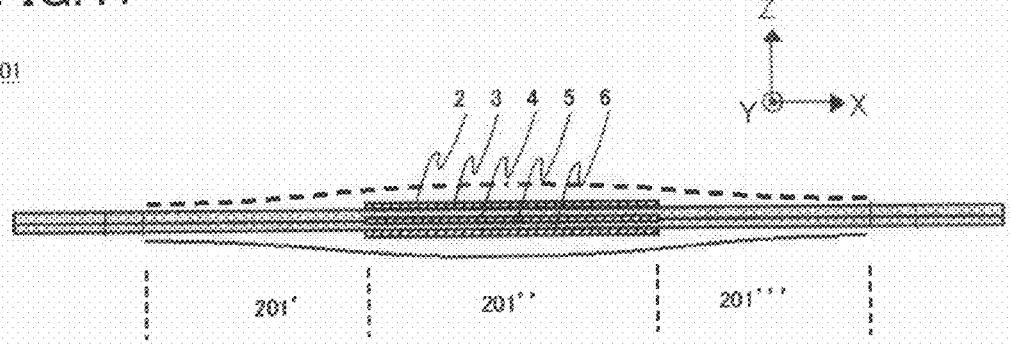
FIG. 41 is a sectional side view of the piezoelectric bending resonator taken along a line A-A of FIG. 40.

FIG. 40 is a top view of the piezoelectric bending resonator 201 according to the third variation of the first embodiment. FIG. 41 is a schematic diagram showing the bending deformation of the piezoelectric bending resonator 201 in the A-A cross section of FIG. 40. The extending direction of the piezoelectric bending resonator 201 is the X direction, a direction perpendicular to the X direction in the film surface is the Y direction, and a direction perpendicular to the film surface is the Z direction. The upper, intermediate, and lower electrodes 2, 4, and 6 are formed on the entire surface in the second portion 201". In the first portion 201', the electrodes have a smaller width because they serve as wirings connecting the electrodes in the first support end 201D and the second portion 201", and in the third portion 201'", there is no electrode.

When a positive voltage is applied to between the upper electrode 2, the lower electrode 6, and the intermediate electrode 4, in the second portion 201", the upper piezoelectric film 3 contracts in the X-axis direction, and the lower piezoelectric film 5 expands in the X-axis direction. Therefore, the second portion 201" projects in the −Z direction. One end of the first portion 201' is fixed to the first support end 201D, and one end of the third portion 201'" is fixed to a second support end 201E. Therefore, the second portion 201" projects in the −Z direction, whereby the vibrating beam 201A bends in the −Z direction, as shown by the solid line of the deformation diagram of FIG. 42. When a negative voltage is applied to between the upper electrode 2 or the lower electrode 6 and the intermediate electrode 4, the vibrating beam 201A bends in the −Z direction, as shown by the dashed line of the deformation diagram of FIG. 41. Thus, when an alternate voltage is applied to between the upper electrode 2 or the lower electrode 6 and the intermediate electrode 4, vibration is generated.

In the first embodiment and the third variation of the first embodiment, the bending action of the piezoelectric resonator is substantially similar, and either configuration may be used.

(Fourth Variation of First Embodiment)

The upper, intermediate, and lower electrodes 2, 4, and 6, which constitute a piezoelectric bending resonator 11 constituting the acceleration sensor 10 detecting acceleration in the first embodiment, are, as with those shown in FIG. 1, formed on the entire surface in a first portion 11' and a third portion 11''' of a vibrating beam 11A. In a second portion 11'', the electrodes have a smaller width because they serve as wirings connecting the electrodes in the first and third portions 11' and 11'''. On the other hand, in a fourth variation of the first embodiment, the upper, intermediate, and lower electrodes 2, 4, and 6 are formed on the substantially entire surface in the first to third portions 211', 211'', and 211''', and in the first and third portions 211' and 211''' and the second portion 211'', the upper, intermediate, and lower electrodes 2, 4, and 6 are connected so that voltage is in opposite phase. Since the entire constitution of the acceleration sensor except for the piezoelectric bending resonator is similar to that of the first embodiment, the details of the entire constitution will be omitted.

Figure 42:
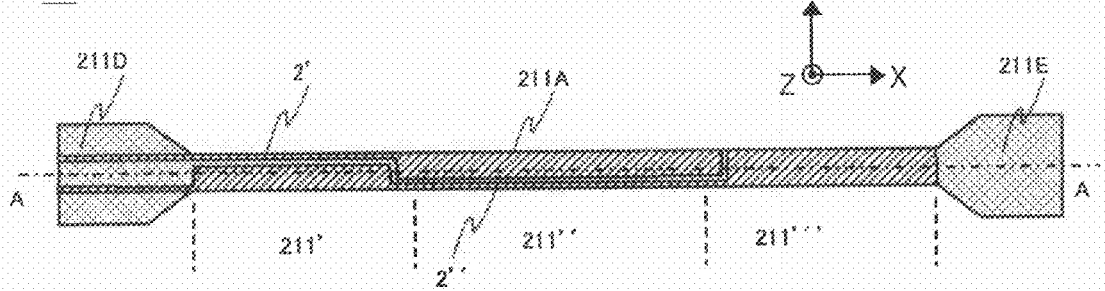
FIG. 42 is a top view of a piezoelectric bending resonator constituting an acceleration sensor according to a fourth variation of the first embodiment.
Figure 43:
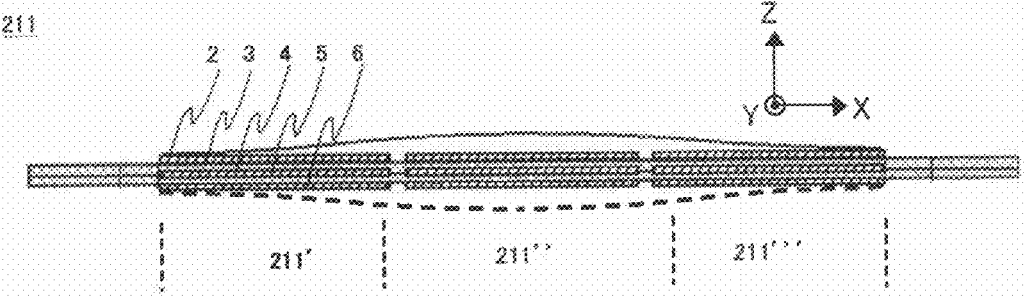
FIG. 43 is a sectional side view of the piezoelectric bending resonator taken along a line A-A of FIG. 42.

FIG. 42 is a top view of the piezoelectric bending resonator 211 according to the fourth variation of the first embodiment. FIG. 43 is a schematic diagram showing the bending deformation of the piezoelectric bending resonator 211 in the A-A cross section of FIG. 42. The extending direction of the piezoelectric bending resonator 211 is the X direction, a direction perpendicular to the X direction in the film surface is the Y direction, and a direction perpendicular to the film surface is the Z direction. The upper, intermediate, and lower electrodes 2, 4, and 6 are formed on the substantially entire surface except for portions (wirings 2' and 2'') in the first to third portions 211', 211'', and 211'''.

The upper, intermediate, lower electrodes 2, 4, and 6 in the first and third portions 211' and 211''' are connected through the wiring 2'' provided in the second portion 211''. The electrodes in the second portions 211'' are connected to a first support end 211D through the wiring 2' provided in the first portion 211'.

When a positive voltage is applied to between the upper and lower electrodes 2 and 6 and the intermediate electrode 4 in the first and third portions 211' and 211''', and when a negative voltage is applied to between the upper and lower electrodes 2 and 6 and the intermediate electrode 4 in the second portion 211'', as shown by the solid line of the deformation diagram of FIG. 43, the vibrating beam 211A is deformed so as to be convex downward (−Z direction) in the first and third portions 211' and 211''' and is deformed so as to be convex upward (+Z direction) in the second portion 211'', so that the piezoelectric bending resonator 211 bends in the +Z direction as a whole. Thus, when the alternate voltage is applied to between the upper and lower electrodes 2 and 6 and the intermediate electrode 4, vibration is generated.

In the third variation of the first embodiment, since a voltage in opposite phase is applied to between the electrodes in the first portion 211' and the third portion 211''' and the electrodes in the second portion 211'', the bending action of the piezoelectric bending resonator 211 is the largest. However, the wirings 2' and 2'' connecting the upper, intermediate, and lower electrodes 2, 4, and 6 are required to be formed, and therefore, it is disadvantage that the vibrating beam 211A has a small width.

(Fifth Variation of First Embodiment)

In the acceleration sensor 10 detecting acceleration in the first embodiment, the two piezoelectric bending resonators 11 and 12 are provided in parallel to the support beam 9 and axisymmetrically with respect to the central axis of the support beam 9. On the other hand, in a fifth variation of the first embodiment, two piezoelectric bending resonators are provided perpendicular to the support beam 9 and axisymmetrically with respect to the central axis of the support beam 9. Since the structure of the piezoelectric bending resonator is the same as that of the first embodiment, the details will be omitted.

Figure 44:
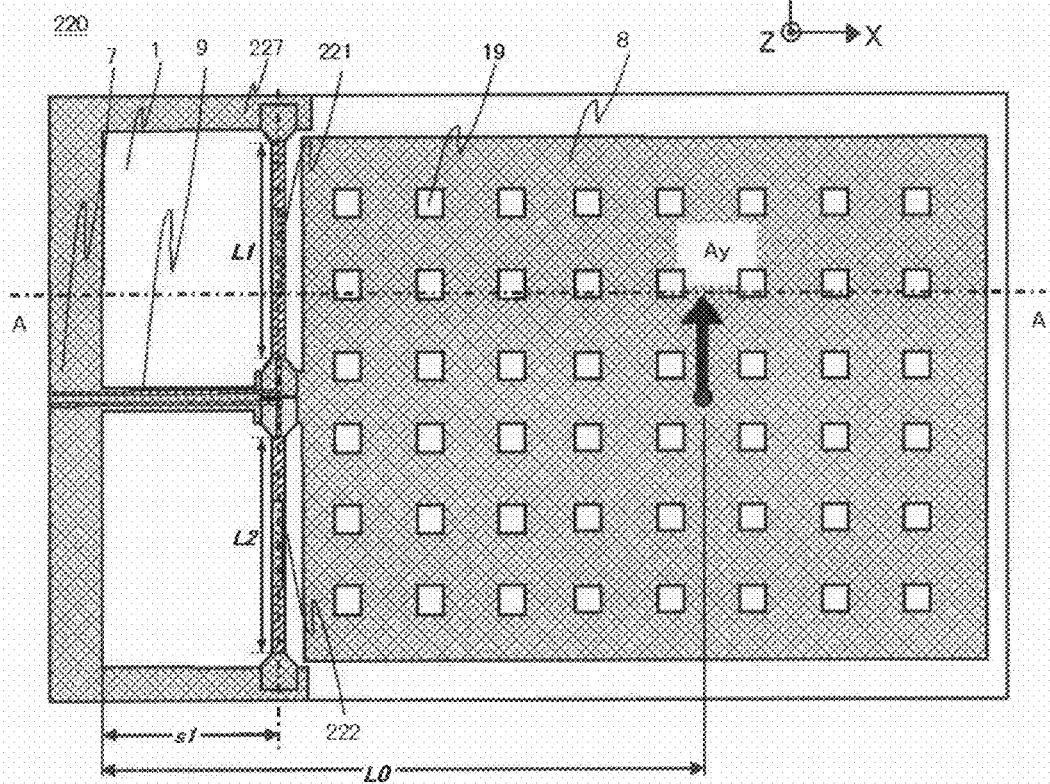
FIG. 44 is a top view of an acceleration sensor according to a fifth variation of the first embodiment.
Figure 45:
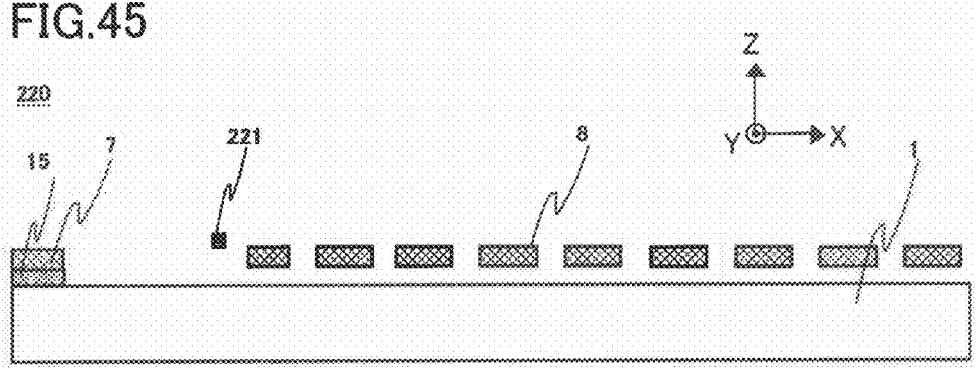
FIG. 45 is a sectional side view of the acceleration sensor taken along a line A-A of FIG. 44.

FIG. 44 is a top view of an acceleration sensor 220 according to the fifth variation of the first embodiment, and FIG. 45 is an A-A sectional side view of FIG. 44. The extending direction of the support beam 9 is the X direction, a direction perpendicular to the X direction in the film surface is the Y direction, and a direction perpendicular to the film surface is the Z direction.

In the acceleration sensor 220, the anchor portion 7, the support beam 9, and the proof mass 8 are integrally provided in a planar manner. The anchor portion 7 has an extending portion 227 extending from a connecting portion with the support beam 9 in the positive and negative Y directions and then extending in the X direction.

First and second piezoelectric bending resonators 221 and 222 are provided perpendicular to the both sides of the support beam 9 and axisymmetrically with respect to the central axis of the support beam 9. The respective one ends of the piezoelectric bending resonators 221 and 222 are connected to the upper surface of the extending portion 227 of the anchor portion 7, and the other ends are connected to the upper surface of support beam 9.

The first and second piezoelectric bending resonators 221 and 222 are exactly the same except that the lengths L1 and L2 of the vibrating beams are slightly different from each other. This is because it prevents the resonances of the first and second piezoelectric bending resonators 221 and 222 from being coupled to have the same resonance frequency.

Here, the case in which the acceleration in the Y-axis direction is applied to the acceleration sensor 220 is considered. By virtue of the acceleration in the Y-axis direction, the inertia force Ay in the Y-axis direction acts on the proof mass 8, and the support beam 9 bends in the Y-axis direction around the anchor portion 7, whereby a compressive stress is applied to the first piezoelectric bending resonator 221, and a tensile stress is applied to the second piezoelectric bending resonator 222. Consequently, the resonance frequency of the first piezoelectric bending resonator 221 is reduced, and the resonance frequency of the second piezoelectric bending resonator 222 is increased. Thus, the difference between the resonance frequencies of the first and second piezoelectric bending resonators 221 and 222 is measured, whereby the magnitude of the acceleration applied in the Y direction can be detected.

At that time, as with the first embodiment, it will turn out that the inertia force applied to the proof mass 8 is amplified by leverage to act on the piezoelectric bending resonator.

Figure 46:
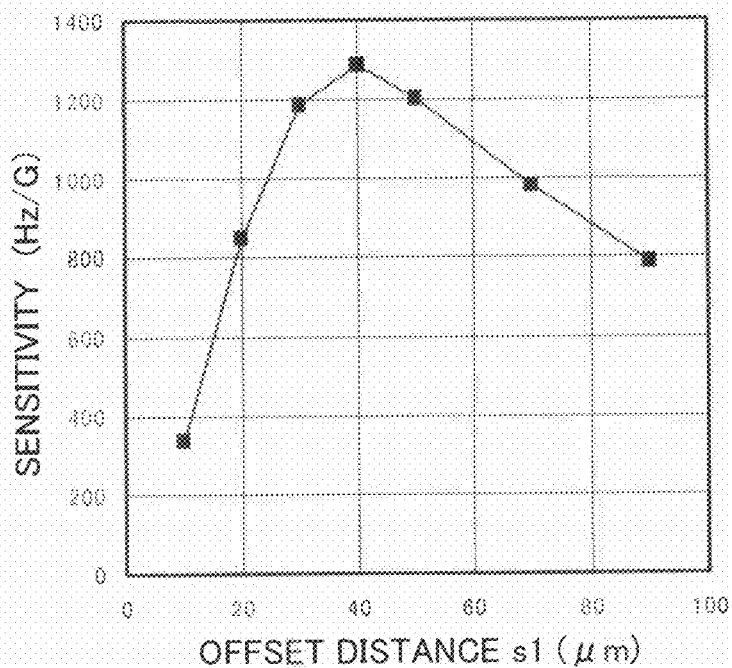
FIG. 46 is a view showing analysis results about sensitivity in the acceleration sensor according to the fifth variation of the first embodiment.

When the support beam 9 has a length of 100 µm, a width of 10 µm, and a thickness of 12 µm, the proof mass 8 has a length of 400 µm, a width of 400 µm, and a thickness of 12 µm, the piezoelectric bending resonators 221 and 222 each have a length of 100 µm, a width of 10 µm, and a thickness of 0.3 µm, and an offset distance from the anchor portion 7 and the center of the first and second piezoelectric bending resonators 221 and 222 is s1, the analysis results of the sensitivity to the acceleration of gravity, that is, the difference of the resonance frequencies between the piezoelectric bending resonators 221 and 222 are shown in FIG. 46.

As seen from the analysis results, when the offset distance s1 is increased, the sensitivity is also increased at first, and after the sensitivity takes the peak value at the offset distance s1 of about 40 µm, the sensitivity is reduced. Namely, the inertia force applied to the proof mass 8 is amplified by the principle of leverage, and the amplifying action exhibits such a very large sensitivity of 1280 Hz/G as the maximum value when the offset distance s1 is 40 µm. In this variation, a distance L0 from the anchor portion 7 to the barycenter is 300 µm, and 40µ of the offset distance s1 corresponds to about 13%.

However, the ratio of the distance L0 from the anchor portion 7 to the barycenter to the offset distance s1 taking the peak of the sensitivity fluctuates depending on the size of each portion, and therefore, in general, it is preferable that the offset distance s1 from the anchor portion 7 to the center of the piezoelectric bending resonators 221 and 222 is set to about not less than 5% and not more than 30% relative to the distance L0 from the anchor portion 7 to the barycenter.

In this variation, the support beam 9 and the piezoelectric bending resonators 221 and 222 are arranged perpendicularly, and therefore, when the support beam 9 is flexed by the application of a large inertia force to the proof mass 8, a shear force applied to the piezoelectric bending resonators 221 and 222 is smaller than that of the first embodiment, and there is an advantage that the Q values of the resonances of the piezoelectric bending resonators 221 and 222 are increased.

(Sixth Variation of First Embodiment)

In the acceleration sensor 10 detecting acceleration in the first embodiment, the two piezoelectric bending resonators 11 and 12 are provided in parallel to the support beam 9 and axisymmetrically with respect to the central axis of the support beam 9. In the fifth variation of the first embodiment, the two piezoelectric bending resonators are provided perpendicular to the support beam 9 and axisymmetrically with respect to the central axis of the support beam 9.

On the other hand, in a sixth variation of the first embodiment, two piezoelectric bending resonators are provided obliquely with respect to the support beam 9 and axisymmetrically with respect to the central axis of the support beam 9. Since the structure of the piezoelectric bending resonator is similar to that of the first embodiment, the details will be omitted.

Figure 47:
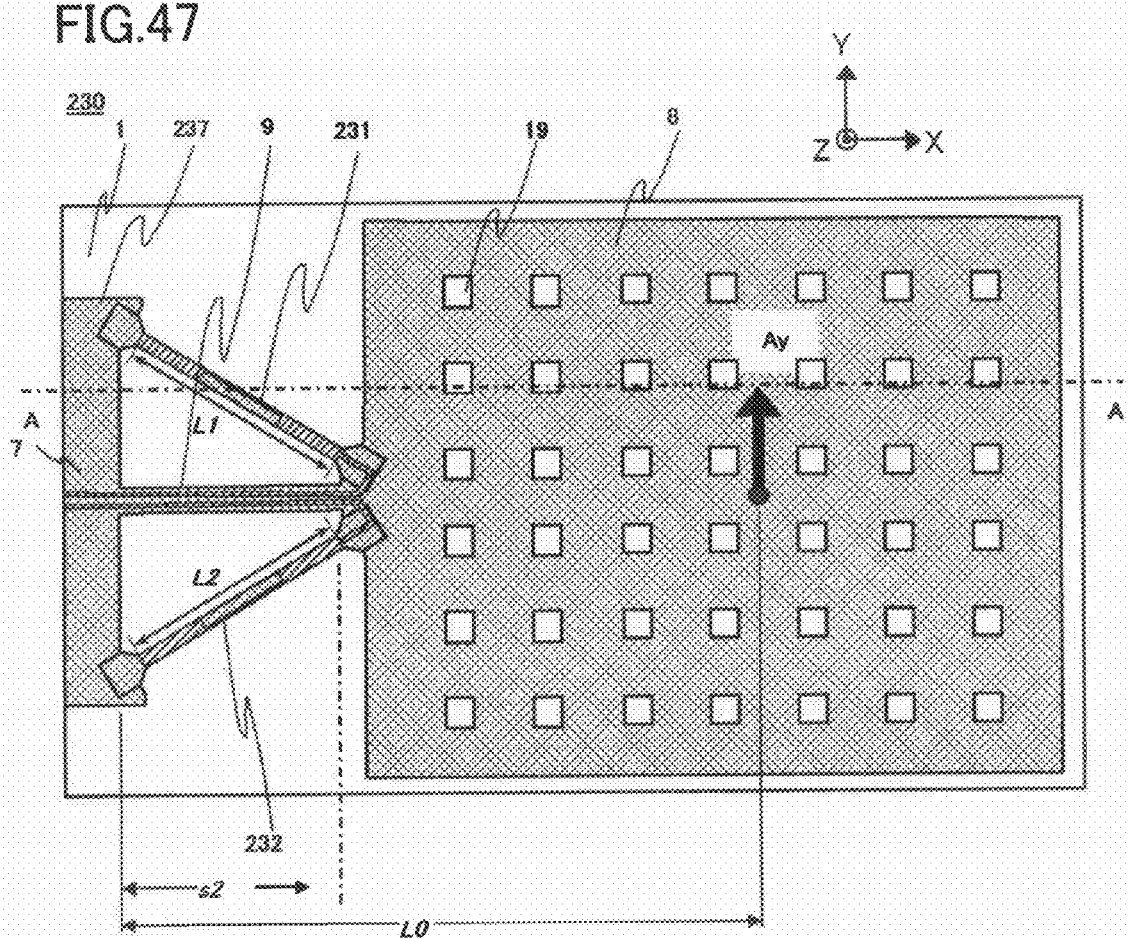
FIG. 47 is a top view of an acceleration sensor according to a sixth variation of the first embodiment.
Figure 48:
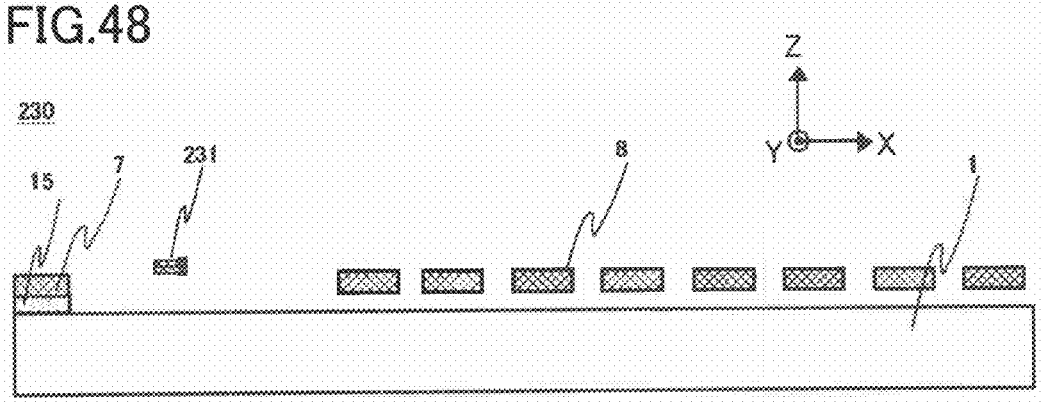
FIG. 48 is a sectional side view of the acceleration sensor taken along a line A-A of FIG. 47.

FIG. 47 is a top view of an acceleration sensor 230 according to the sixth variation of the first embodiment, and FIG. 48 is an A-A sectional side view of FIG. 47. The extending direction of the support beam 9 is the X direction, a direction perpendicular to the X direction in the film surface is the Y direction, and a direction perpendicular to the film surface is the Z direction.

In the acceleration sensor 230, the anchor portion 7, the support beam 9, and a proof mass 8 are integrally provided in a planar manner. The anchor portion 7 has an extending portion 237 extending from a connecting portion with the support beam 9 in the positive and negative Y directions.

First and second piezoelectric bending resonators 231 and 232 are provided obliquely with respect to the both sides of the support beam 9 and axisymmetrically with respect to the central axis of the support beam 9. The respective one ends of the piezoelectric bending resonators 231 and 232 are connected to the upper surface of the extending portion 237 of the anchor portion, and the other ends are connected to the upper surface of the support beam 9.

The first and second piezoelectric bending resonators 231 and 232 are exactly the same except that lengths L1 and L2 of the vibrating beams are slightly different from each other. This is because it prevents the resonances of the first and second piezoelectric bending resonators 231 and 232 from being coupled to have the same resonance frequency.

Here, the case in which the acceleration in the Y-axis direction is applied to the acceleration sensor 230 is considered. By virtue of the acceleration in the Y-axis direction, the inertia force Ay in the Y-axis direction acts on the proof mass 8, and the support beam 9 bends in the Y-axis direction around the anchor portion 7, whereby a compressive stress is applied to the first piezoelectric bending resonator 231, and a tensile stress acts on the second piezoelectric bending resonator 232. Consequently, the resonance frequency of the first piezoelectric bending resonator 231 is reduced, and the resonance frequency of the second piezoelectric bending resonator 232 is increased. Thus, the difference of the resonance frequencies between the first and second piezoelectric bending resonators 231 and 232 is measured, whereby the magnitude of the acceleration applied in the Y direction can be detected.

At that time, as with the first embodiment and the fifth variation of the first embodiment, the inertia force applied to the proof mass 8 is amplified by leverage to act on the piezoelectric bending resonator.

When the support beam 9 has a length of 100 μm, a width of 10 μm, and a thickness of 12 μm, the proof mass 8 has a length of 400 μm, a width of 400 μm, and a thickness of 12 μm, the piezoelectric bending resonators 231 and 232 each have a length of 100 μm, a width of 10 μm, and a thickness of 0.3 μm, and the offset distance from the anchor portion 7 to a connecting portion with the support beam 9 of the piezoelectric bending resonators 231 and 232 is s2, the analysis results of the sensitivity to the acceleration of gravity, that is, the difference of the resonance frequencies between the piezoelectric bending resonators 231 and 232 are shown in FIG. 49.

When the offset distance s2 is increased, the sensitivity is also increased at first, and after the sensitivity takes the peak value at the offset distance s2 of about 40 μm, the sensitivity is reduced. Namely, the inertia force applied to the proof mass 8 is amplified by the principle of leverage, and the amplifying action exhibits such a very large sensitivity of 1270 Hz/G as the maximum value when the offset distance s2 is 40 μm. In this variation, the distance L0 from the anchor portion 7 to the barycenter is 300 μm, and 40μ of the offset distance s2 corresponds to about 13%.

However, the ratio of the distance L0 from the anchor portion 7 to the barycenter to the offset distance s2 taking the peak of the sensitivity fluctuates depending on the size of each portion, and therefore, in general, it is preferable that the offset distance s2 from the anchor portion 7 to the center of the piezoelectric bending resonators 231 and 232 is set to about not less than 5% and not more than 30% relative to the distance L0 from the anchor portion 7 to the barycenter.

In this variation, the support beam 9 and the piezoelectric bending resonators 231 and 232 are arranged perpendicularly, and therefore, when the support beam 9 is flexed by the application of a large inertia force to the proof mass 8, a shear force applied to the piezoelectric bending resonators 231 and 232 is smaller than that of the first embodiment, and there is an advantage that the Q values of the resonances of the piezoelectric bending resonators 231 and 232 are increased.

(Second Embodiment)

In the acceleration sensor of the first embodiment, with respect to the extending direction (X direction) of the piezoelectric bending resonator, the direction of detecting acceleration is the direction (Y direction) perpendicular to the extending direction of the piezoelectric bending resonator in the film surface. An acceleration sensor of the second embodiment detects biaxial acceleration in a direction (Y direction) perpendicular to the extending direction of the piezoelectric bending resonator in a piezoelectric film surface and a direction (Z direction) perpendicular to the piezoelectric film surface.

Figure 14A:
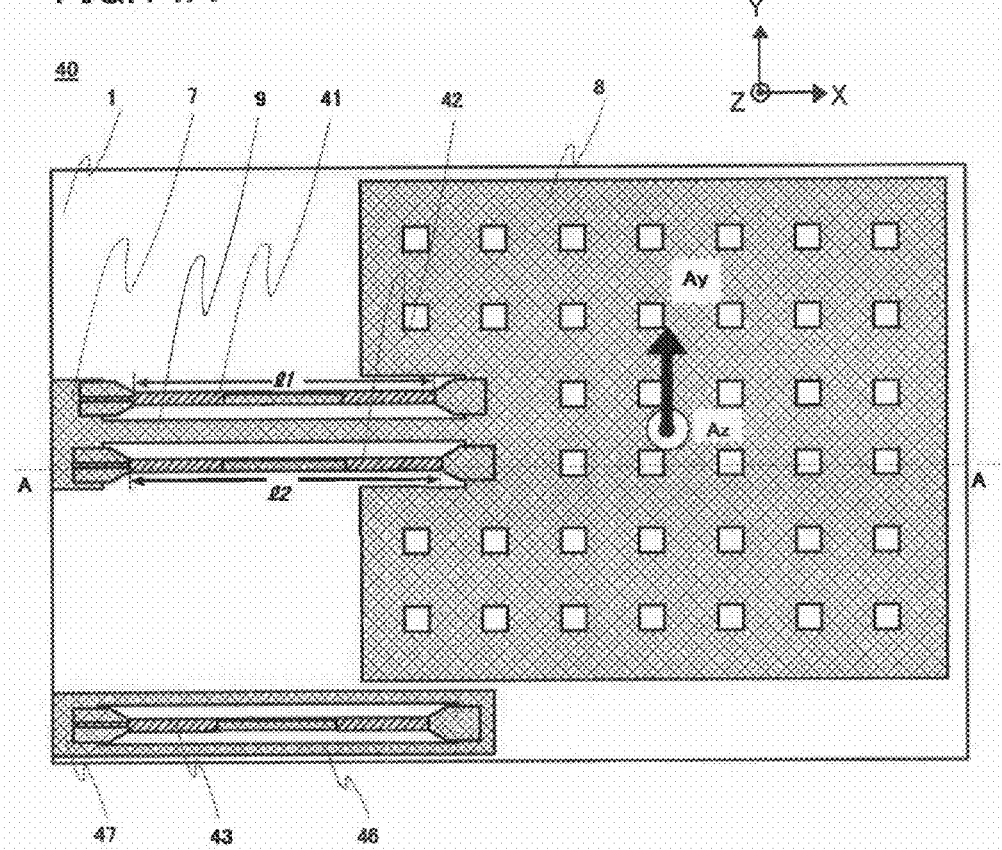
FIG. 14A is a top view of an acceleration sensor according to a second embodiment.

FIG. 14A is a top view of the entirety of an acceleration sensor 40 detecting acceleration in the second embodiment. The acceleration sensor 40 has a proof mass 8, a support beam 9, and measuring piezoelectric bending resonators 41 and 42 exactly similar to those of the first embodiment and further has a referential piezoelectric bending resonator (a third piezoelectric bending resonator) 43. The both ends of the referential piezoelectric bending resonator 43 are formed on a support frame 46, and one end (anchor portion) 47 of the support frame 46 is connected onto and held by a substrate 1. Namely, the support frame 46 except for the anchor portion 47 at one end is held above the substrate 1 through a space.

Since the first and second measuring piezoelectric bending resonators 41 and 42 and the referential piezoelectric bending resonator 43 are similar to the piezoelectric bending resonator 11 of the first embodiment, the details will be omitted. Namely, the third piezoelectric bending resonator 43 is constituted of an upper electrode (a third electrode) 2, an upper piezoelectric film (a second piezoelectric film) 3, an intermediate electrode (a fourth electrode) 4, a lower piezoelectric film (a fifth piezoelectric film) 5, and a lower electrode (an eighth electrode) 6.

The first and second measuring piezoelectric bending resonators 41 and 42 are different from the support beam 9 in the height of the center line of the thickness in the Z direction of an XZ cross section. Namely, a distance from the center lines of the first and second measuring piezoelectric bending resonators 41 and 42 to the substrate 1 is different from a distance from the center line of the support beam 9 to the substrate 1.

Needless to say, instead of the piezoelectric bending resonator 11 of the first embodiment, there may be used a piezoelectric bending resonator equivalent to the piezoelectric bending resonator 21 of the first variation of the first embodiment, the piezoelectric bending resonator 31 of the second variation of the first embodiment, the piezoelectric bending resonator 41 of the third variation of the first embodiment, and the piezoelectric bending resonator 51 of the fourth variation of the first embodiment.

Figure 14B:
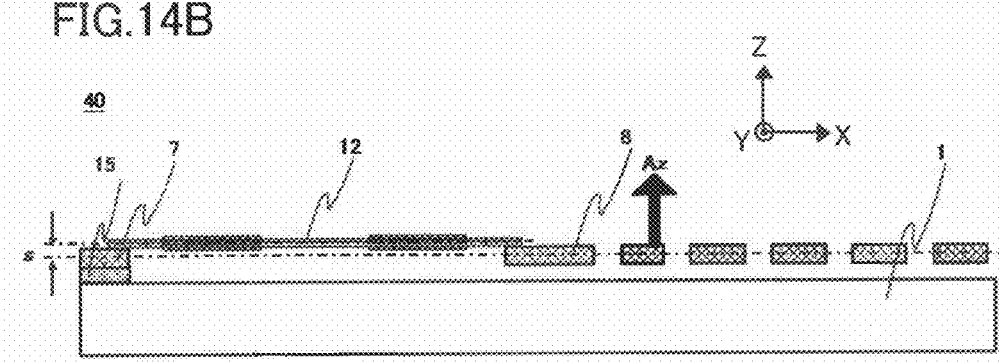
FIG. 14B is a sectional side view of the acceleration sensor taken along a line A-A of FIG. 14A.

Here, the case in which the acceleration in the Z-axis direction is applied to the acceleration sensor 40 is considered. By virtue of the acceleration in the Z-axis direction, the inertia force Ay in the Z-axis direction acts on the proof mass 8, and the support beam 9 bends in the Z-axis direction around a anchor portion 7. At this time, since the first or second measuring piezoelectric bending resonators 41 or 42 is formed above the support beam 9 (see, FIG. 14B), the compressive stress acts on the first or second measuring piezoelectric bending resonators 41 or 42, and the resonance frequency is reduced. At this time, as with the first embodiment, in proportion to the ratio L0/s of the distance L0 (not shown) from the anchor portion 7 to the center of gravity of the proof mass of the distance s (not shown) from a film thickness center of the support beam 9 to the film thickness center of the piezoelectric bending resonators 41 and 42, the inertia force applied to the piezoelectric bending resonators 41 and 42 is amplified by the principle of leverage.

Meanwhile, since no proof mass is connected to the referential piezoelectric bending resonator 43, the resonance frequency stays constant. Thus, a difference between the average of the resonance frequencies of the first and second measuring piezoelectric bending resonators 41 and 42 and the resonance frequency of the referential piezoelectric bending resonator 43 is measured by a comparison unit, whereby the magnitude of the acceleration applied in the Z direction can be detected or calculated by a calculation unit.

Since a case in which the acceleration in the Y-axis direction is applied to the acceleration sensor 40 is exactly similar to that in the first embodiment, the detailed description will be omitted. By virtue of the inertia force Ay in the Y-axis direction, a compressive stress acts on the first piezoelectric bending resonator 41, and a tensile stress acts on the second piezoelectric bending resonator 42. Consequently, the resonance frequency of the first piezoelectric bending resonator 41 is reduced, and the resonance frequency of the second piezoelectric bending resonator 42 is increased. Thus, the difference of the resonance frequencies between the first and second measuring piezoelectric bending resonators 41 and 42 is measured, whereby the magnitude of the acceleration applied in the Y direction can be detected.

When acceleration is applied in the X-axis direction in the acceleration sensor 40, a slight amount of tensile stress in the X-axis direction is applied to the first and second measuring piezoelectric bending resonators 41 and 42. However, the tensile stress is significantly smaller than the tensile stress generated when acceleration is applied in the Z-axis direction, and thus the tensile stress can be ignored except that highly accurate measurement is required specially. When the highly accurate measurement is required, correction may be performed by, for example, a method of the third embodiment to be described.

The referential piezoelectric bending resonator 43 is supported on the support frame 46 so as to have mechanical conditions equivalent to the mechanical conditions of the measuring piezoelectric bending resonator 41 or 42 supported by the support beam 9. Namely, when a temperature change occurs in the sensor, a distortion corresponding to a thermal expansion difference between the support beam 9 and the measuring piezoelectric bending resonator 41 or 42 is applied to the measuring piezoelectric bending resonator 41 or 42, and a shift of the resonance frequency occurs. At this time, if a similar thermal distortion is applied from the support frame 46 to the referential piezoelectric bending resonator 43, a similar resonance frequency shift occurs, and the resonance frequency shifts in the measuring piezoelectric bending resonator and the referential piezoelectric bending resonator are offset.

Further, a case in which a temperature change occurs in the acceleration sensor 10 is considered. A thermal stress is applied to the first and second piezoelectric bending resonators 11 and 12 in accordance with a difference between a thermal expansion coefficient of the support beam 9 and the thermal expansion coefficient of the first and second piezoelectric bending resonators 11 and 12, and the resonance frequency changes.

At that time, the referential piezoelectric bending resonator 43 is supported on the support frame 46, and when a temperature change occurs, a thermal stress is applied to the referential piezoelectric bending resonator 43 in accordance with a difference between the thermal expansion coefficient of the support frame 46 and the thermal expansion coefficient of the referential piezoelectric bending resonator 43, and the resonance frequency changes.

If a ratio of the width of the support beam 9 to the sum of the widths of the two measuring piezoelectric bending resonators 41 and 42 is equivalent to a ratio of the sum of widths of the both sides of the support frame 46 (a portion parallel to the referential piezoelectric bending resonator 43) to the width of the referential piezoelectric bending resonator 43, the heat stress applied to the measuring piezoelectric bending resonator 41 or 42 and the referential piezoelectric bending resonator 43 and the resonance frequency shifts are equivalent, and change does not occur when the difference between the two is taken. Namely, no sensitivity is provided for temperature change.

In the present embodiment, the support beam 9 and the proof mass 8 may have the same thickness, or the thickness of the support beam 9 may be smaller than the thickness of the proof mass 8. The amount of displacement of the proof mass 8 obtained when the inertia force in the Z-axis direction is applied to the proof mass 8 is proportional to the minus square of the thickness of the support beam 9, and therefore, the smaller the thickness of the support beam 9, the higher the acceleration sensitivity in the Z direction.

As described above, in the acceleration sensor 40 detecting acceleration in the second embodiment, there can be realized an acceleration sensor detecting biaxial acceleration, and the acceleration sensor has a sensitivity of the acceleration in the Z-axis and Y-axis directions, has little sensitivity in the X-axis direction, and has no sensitivity of temperature change.

Figure 15A:
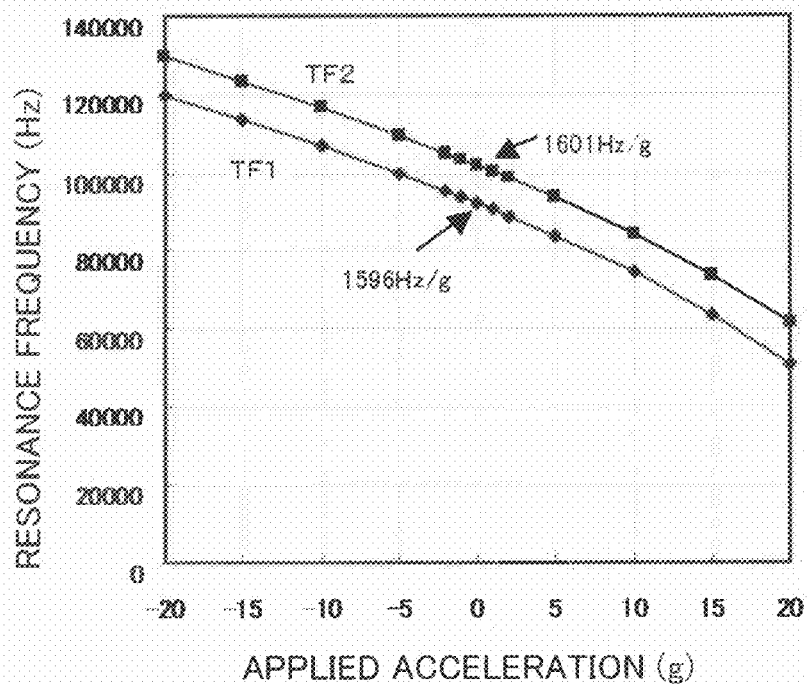
FIG. 15A is a view showing a measurement example of the resonance frequency change with respect to the acceleration in the acceleration sensor according to the second embodiment.

FIG. 15A shows an example of measuring the performance of the obtained acceleration sensor 40 according to the second embodiment. The size of the proof mass is 500×500×15 µm, the size of the support beam is 180×6×15 µm, the size of a piezoelectric bending resonator 1 (TF1) is 180×20×0.3 µm, and the size of a piezoelectric bending resonator 2 (TF2) is 160×20×0.3 µm. The conditions are the same as those of the first embodiment.

When the acceleration in the Y direction is applied, a response similar to that in the first embodiment is obtained, and the sensor has a very large sensitivity of the acceleration in the Y direction.

FIG. 15A shows a response obtained when the acceleration in the Z direction is applied. In such a state that no acceleration is applied, the TF1 has a resonance frequency of about 90 kHz, and TF2 has a resonance frequency of about 100 kHz. However, when the acceleration in the Z direction is applied, the resonance frequencies of TF1 and TF2 are significantly reduced by compressive stress, and such a very large frequency change sensitivity of about −1600 Hz/g can be obtained.

Figure 15B:
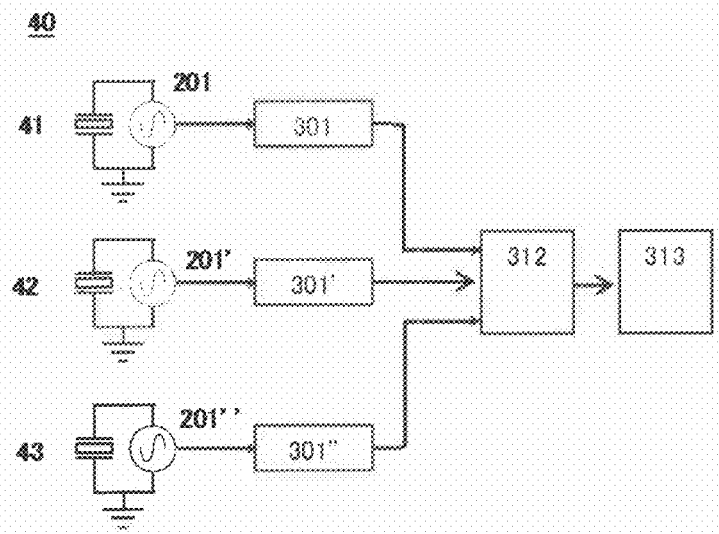
FIG. 15B is a view showing a processing for calculating the acceleration in the acceleration sensor according to the first embodiment.

FIG. 15B is a view showing processing for calculating the acceleration in Z-axis direction of the acceleration sensor 40 according to the second embodiment. The measuring piezoelectric bending resonators 41 and 42 and the referential piezoelectric bending resonator 43 are connected respectively to oscillating circuits 201, 201', and 201". The oscillating circuits 201, 201', and 201" are connected respectively to frequency counters 301, 301', and 301". The frequency counters 301, 301', and 301" are connected to a comparison unit 302. The comparison unit 302 is connected to a calculation unit 303. The comparison unit 302 calculates an average of the frequencies of the two measuring piezoelectric bending resonators 41 and 42 measured by the frequency counters 301 and 301' to obtain a difference between the average and the frequency of the referential piezoelectric bending resonator 43 (a second value) measured by the frequency counter 301". The calculation unit 313 calculates the acceleration in the Z-axis direction using the formula (1) from the difference between the average of the frequencies of the measuring piezoelectric bending resonators 41 and 42 and the frequency of the referential piezoelectric bending resonator 43 obtained by the comparison unit 312. According to this constitution, the acceleration in the direction perpendicular to the substrate 1 can be detected.

(Third Embodiment)

In the second embodiment, with respect to the extending direction (X direction) of the piezoelectric bending resonator, the acceleration sensor has detecting directions of biaxial acceleration in the direction (Z direction) perpendicular to the film surface and the direction (Y direction) perpendicular to the extending direction of the piezoelectric bending resonator in the film surface. An acceleration sensor according to the third embodiment is an acceleration sensor which detects acceleration in all three X, Y, and Z axis directions.

Figure 16:
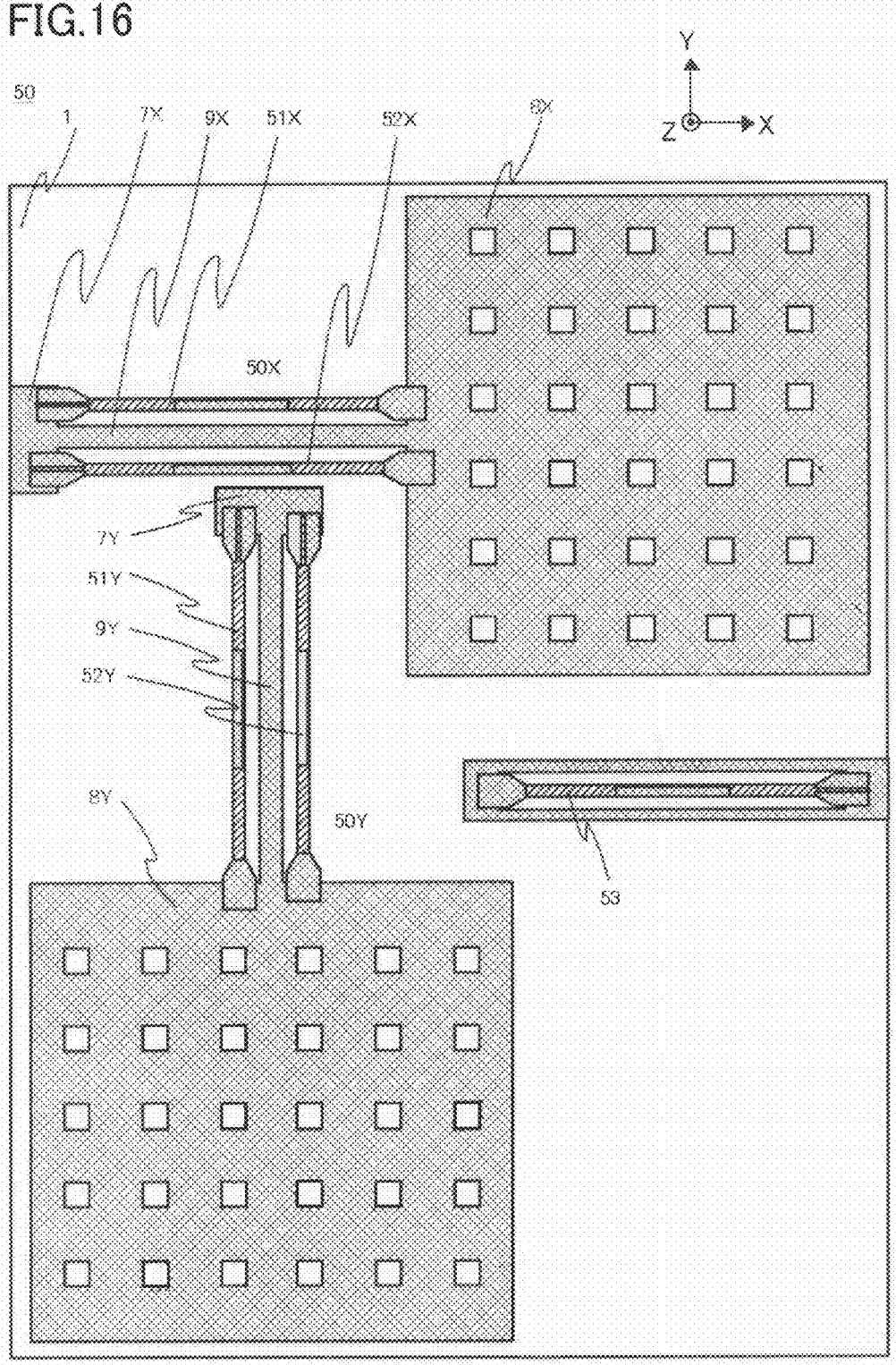
FIG. 16 is a top view of an acceleration sensor according to a third embodiment.

FIG. 16 is a top view of the entirety of an acceleration sensor 50 according to the third embodiment. The acceleration sensor 50 of the present embodiment has a first acceleration sensor unit 50X which extends in the X-axis direction and can detect the acceleration in the Y-axis and Z-axis directions and a second acceleration sensor unit 50Y which extends in the Y-axis direction and can detect the acceleration in the X-axis and Z-axis directions. According to this constitution, the acceleration sensor 50 can measure the triaxial acceleration.

The first and second acceleration sensor units 50X and 50Y have a constitution equivalent to that of the acceleration sensor 40 of the second embodiment. However, the first and second acceleration sensor units 50X and 50Y share a referential piezoelectric bending resonator 53.

A difference of the resonance frequency between a first detecting piezoelectric bending resonator 51X of the first acceleration sensor unit 50X and the referential piezoelectric bending resonator 53 is $\Delta f_{1X}$, and a difference of the resonance frequency between a second detecting piezoelectric bending resonator 52X and the referential piezoelectric bending resonator 53 is $\Delta f_{2X}$. A difference of the resonance frequency between a first detecting piezoelectric bending resonator 51Y of the second acceleration sensor unit 50Y and the referential piezoelectric bending resonator 53 is $\Delta f_{1Y}$, and a difference of the resonance frequency between a second detecting piezoelectric bending resonator 52Y and the referential piezoelectric bending resonator 53 is $\Delta f_{2Y}$.

With regard to the first detecting piezoelectric bending resonator 51X of the first acceleration sensor unit 50X, for example, the gauge factor of the resonance frequency change with respect to the Y-axis direction acceleration is α, the gauge factor of the frequency change with respect to the X-axis direction acceleration is β (α>>β), and the gauge factor of the frequency change with respect to the Z-axis direction acceleration is γ. The detecting piezoelectric bending resonators 52X, 51Y, and 52Y also have similar gauge factors α, β, and γ.

Outputs Vx, Vy, and Vz to the acceleration in the X, Y, and Z directions are represented by the following formulas (3) to (5):

$$Vx=\alpha((\Delta f_{1Y}-\Delta f_{2Y})-\beta(\Delta f_{1X}-\Delta f_{2X})); \quad (3)$$

$$Vy=\alpha((\Delta f_{1X}-\Delta f_{2X})-\beta(\Delta f_{1Y}-\Delta f_{2Y})); \text{ and} \quad (4)$$

$$Vz=\gamma(\Delta f_{1X}+\Delta f_{2X}+\Delta f_{1Y}+\Delta f_{2Y})/4. \quad (5)$$

By virtue of the use of two pairs of biaxial acceleration sensors, an acceleration sensor which can easily measure the triaxial acceleration can be constituted. Especially, patterning is simultaneously performed in the same chip, whereby a pair of sensors accurately perpendicular to each other is obtained, and therefore, a triaxial acceleration sensor with extremely reduced cross-axis sensitivity can be obtained.

(Fourth Embodiment)

The acceleration sensor of the third embodiment detects the acceleration in the all three X, Y, and Z axis directions. An acceleration sensor according to a fourth embodiment detects not only the acceleration in the three X, Y, and Z axes but also the angular acceleration (roll acceleration) around the three X, Y, and Z axes.

FIG. 17 is a top view of the entirety of an acceleration sensor 60 according to the fourth embodiment. The acceleration sensor 60 of the present embodiment has a first acceleration sensor unit 60X+ extending in the X+ direction, a second acceleration sensor unit 60×− extending in the X− direction, a third acceleration sensor unit 60Y+ extending in the Y+ direction, and a fourth acceleration sensor unit 60Y− extending in the Y− direction.

The first to fourth acceleration sensor units 60X+, 60X−, 60Y+, and 60Y− have a constitution similar to that of the acceleration sensor 40 of the second embodiment. However, a referential piezoelectric bending resonator 63 is shared by the first to fourth acceleration sensor units 60X+, 60X−, 60Y+, and 60Y−.

The measurement principle of the angular acceleration will be briefly described. With regard to a first acceleration sensor unit 60X+ and a second acceleration sensor unit 60X−, if a force by acceleration is applied in the Y+ direction, the piezoelectric bending resonators of the first and second acceleration sensor units 60X+ and 60X− flex in the Y+ direction around an anchor 7 as a fulcrum point. Meanwhile, if a clockwise force around the Z axis is applied by the angular acceleration around the Z axis, the piezoelectric bending resonator of the first acceleration sensor unit 60X+ flexes in the Y− direction around the anchor 7 as a fulcrum point, and the piezoelectric bending resonator of the second acceleration sensor unit 40X− flexes in the Y+ direction around the anchor 7 as a fulcrum point. Thus, with regard to the flexure in the Y direction of the piezoelectric bending resonators of the first and second acceleration sensor units 60X+ and 60X−, if the sum is taken, the acceleration in the Y direction can be detected, and if the difference is taken, the angular acceleration around the Z axis can be detected. The acceleration in other directions and the angular acceleration around other axes can be calculated in a similar manner.

A difference of the resonance frequency between a first detecting piezoelectric bending resonator 61X+ of a first acceleration sensor unit 60X+ and a referential piezoelectric bending resonator 63X+ is $\times f_{1X+}$, and a difference of the resonance frequency between a second detecting piezoelectric bending resonator 62X+ and the referential piezoelectric bending resonator 63X+ is $\Delta f_{2X+}$. A difference of the resonance frequency between a first detecting piezoelectric bending resonator 61X− of a second acceleration sensor unit 60X− and a referential piezoelectric bending resonator 63X− is $\Delta f_{1X-}$, and a difference of the resonance frequency between a second detecting piezoelectric bending resonator 62X− and the referential piezoelectric bending resonator 63X− is $\Delta f_{2X-}$. A difference of the resonance frequency between a first detecting piezoelectric bending resonator 61Y+ of a third acceleration sensor unit 60Y+ and a referential piezoelectric bending resonator 63Y+ is $\Delta f_{1Y+}$, and a difference of the resonance frequency between a second detecting piezoelectric bending resonator 62Y+ and the referential piezoelectric bending resonator 63Y+ is $\Delta f_{2Y+}$. A difference of the resonance frequency between a first detecting piezoelectric bending resonator 61Y− of a fourth acceleration sensor unit 60Y− and a referential piezoelectric bending resonator 63Y− is and a difference of the resonance frequency between a second detecting piezoelectric bending resonator 62Y− and the referential piezoelectric bending resonator 63Y− is $\Delta f_{2Y-}$.

For example, with regard to a first detecting piezoelectric bending resonator 61X+ of a first acceleration sensor unit, the gauge factor of the resonance frequency change with respect to the Y-axis direction acceleration is $\alpha$, the gauge factor of the resonance frequency change with respect to the X-axis direction acceleration is $\beta$ ($\alpha \gg \beta$), and the gauge factor of the resonance frequency change with respect to the Z-axis direction acceleration is $\gamma$. The detecting piezoelectric bending resonators 61X−, 62X+, 62X−, 61Y+, 61Y−, 62Y+, and 62Y− also have similar gauge factors $\alpha$, $\beta$, and $\gamma$.

Further, for example, with regard to a first detecting piezoelectric bending resonator 61X+, the gauge factor of the resonance frequency change with respect to the angular acceleration around the Z axis is $\zeta$, and the gauge factor of the resonance frequency change with respect to the angular acceleration around the Y axis is $\eta$. The detecting piezoelectric bending resonators 61X−, 62X+, 62X−, 62Y+, 61Y−, 62Y+, and 62Y− also have similar gauge factors and q.

The outputs Vx, Vy, and Vz to the acceleration in the X, Y, and Z directions and the angular accelerations Wx, Wy, and Wz around the X, Y, and Z axes are represented by the following formulae (6) to (11):

$$Vx=\alpha((\Delta f_{1Y+}-\Delta f_{2Y+}+\Delta f_{1Y-}-\Delta f_{2Y-})-\beta((\Delta f_{1X+}-\Delta f_{2X+}+\Delta f_{1X-}-\Delta f_{2X-}))/4; \quad (6)$$

$$Vy=\alpha((\Delta f_{1X+}-\Delta f_{2X+}+\Delta f_{1X-}-\Delta f_{2X-})-\beta((\Delta f_{1Y+}-\Delta f_{2Y+}+\Delta f_{1Y-}-\Delta f_{2X-}))/4; \quad (7)$$

$$Vz=\gamma((\Delta f_{1X+}+\Delta f_{2X+}+\Delta f_{1x-}-\Delta f_{2x-}+\Delta f_{1Y+}+\Delta f_{2Y+}+\Delta f_{1Y-}+\Delta f_{2Y-})/8; \quad (8)$$

$$Wx=\zeta((\Delta f_{1Y+}+\Delta f_{2Y+}-\Delta f_{1Y-}-\Delta f^{2Y-})/4; \quad (9)$$

$$Wy=\zeta((\Delta f_{1Y+}+\Delta f_{2Y+}-\Delta f_{1x-}-\Delta f_{2x-})/4; \text{ and} \quad (10)$$

$$Wz=\eta(\Delta f_{1X+}\Delta f_{2X+}\Delta f_{1x-}+\Delta f_{2x-}+\Delta f_{1Y+}-\Delta f_{2Y+}-\Delta f_{1Y-}+\Delta f_{2Y-})/8. \quad (11)$$

By virtue of the use of four pairs of biaxial acceleration sensors, an acceleration sensor which can easily measure the triaxial acceleration and the angular acceleration around three axes can be constituted.

(Fifth Embodiment)

In an acceleration sensor detecting acceleration in a fifth embodiment, the acceleration sensor body detecting acceleration is exactly similar to that of the second embodiment; however, the fifth embodiment is different from the second embodiment in that the periphery of the acceleration sensor body detecting acceleration is surrounded by a stopper, a lid is formed above the acceleration sensor body, detecting acceleration, through an upper gap, and the acceleration sensor body detecting acceleration is sealed.

FIG. 18 is a top view of an acceleration sensor 70 detecting acceleration in the fifth embodiment (for convenience of explanation, an upper adhesion layer 76 and a lid 72 are not illustrated). FIG. 19 is an A-A sectional side view of FIG. 18.

In the acceleration sensor 70 detecting acceleration in the present embodiment, a stopper 71 is formed around a proof mass 8 through a gap 73. It is preferable that the gap 73 is set to approximately several times the deformation volume obtained when the acceleration corresponding to the detection limit in the Y direction is applied to the proof mass 8. In general, it is approximately 0.1 μm to several μm.

As shown in FIG. 19, the lid 72 is formed above the proof mass 8 through an upper gap 75. A substrate 1 is provided under the proof mass 8 through a lower gap 74. It is preferable that the upper gap 75 and the lower gap 74 are set to several times the deformation volume obtained when the acceleration corresponding to the detection limit in the Z direction is applied to the proof mass 8. In general, it is approximately 0.2 μm to 10 μm.

Next, a case in which an impact load is applied to the acceleration sensor 70 detecting acceleration is considered. Since a support beam 9 and the proof mass 8 are linearly and continuously formed from an anchor 7 in the X-axis direction, the structural intensity in the X-axis direction is high, and there is no problem when the impact load is applied in the X-axis direction.

Meanwhile, when the impact load is applied in the Y-axis direction, the support beam 9 and the proof mass 8 bend in the Y-axis direction around the anchor portion 7 according to the impact load. However, since the stopper 71 is formed to approach the proof mass 8 through the gap 73, the proof mass 8 is in contact with the stopper 71 to restrict the bending deformation, and it is possible to prevent from applying an excessive stress to the piezoelectric bending resonators and the like to damage them.

Meanwhile, when the impact load is applied in the Z-axis direction, the support beam 9 and the proof mass 8 bend in the Z-axis direction around the anchor portion 7 according to the impact load. Since the substrate 1 is provided to approach the proof mass 8 through the lower gap 74, for the impact load in the Z-axis minus direction, the proof mass 8 is in contact with the substrate 1 to restrict the bending deformation, and it is possible to prevent from applying an excessive stress to a detection part and the like to damage them. For the impact load in the Z-axis plus direction, as shown in the cross-sectional view of FIG. 16, the entire sensor is sealed by the lid 72 through the upper adhesion layer 76, and the lid 72 faces the proof mass 8 through the upper gap 75, whereby the proof mass 8 is in contact with the lid 72 to restrict the bending deformation, so that it is possible to prevent from applying an excessive stress to a detection part and the like to damage them.

As described above, in the acceleration sensor 70 detecting acceleration in the fifth embodiment, there can be realized an acceleration sensor detecting single-axis acceleration, and the acceleration sensor has a sensitivity of the acceleration only in the Y-axis direction, has no sensitivity in the X-axis and Z-axis directions, and has a sufficient durability against the impact forces in the X, Y, and Z axis directions.

(Sixth Embodiment)

The piezoelectric bending resonators used in the acceleration sensors in the first to fifth embodiments have a so-called symmetric bimorph structure and are constituted of five layers of the upper electrode 2, the upper piezoelectric film 3, the intermediate electrode 4, the lower piezoelectric film 5, and the lower electrode 6, as shown in FIG. 2, for example. In a resonator having the symmetric bimorph structure, for example, the contraction of the upper piezoelectric film 3 and the expansion of the lower piezoelectric film 5 cause bending, and thus the symmetric bimorph structure is the most efficient bending resonance structure.

Figure 20:
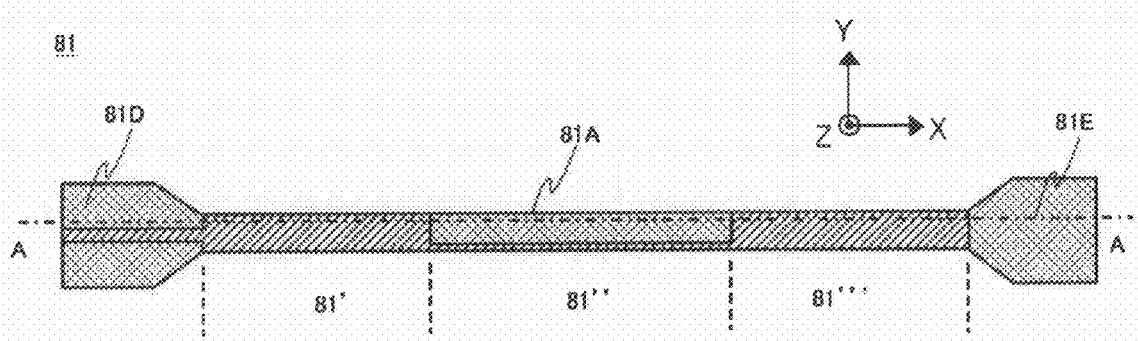
FIG. 20 is a top view of a piezoelectric bending resonator of an acceleration sensor according to a sixth embodiment.
Figure 21:
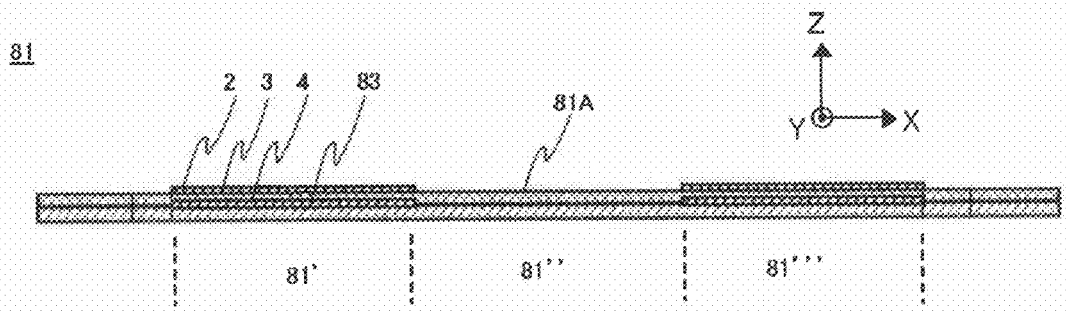
FIG. 21 is a sectional side view of the piezoelectric bending resonator taken along a line A-A of FIG. 20.

A piezoelectric bending resonator in a sixth embodiment is characterized by having an asymmetric bimorph structure instead of the symmetric bimorph structure. FIG. 20 is a top view of a piezoelectric bending resonator 81 of the sixth embodiment, and FIG. 21 is an A-A sectional side view of FIG. 20.

The piezoelectric bending resonator 81 of the sixth embodiment is constituted of four layers of the upper electrode 2, the upper piezoelectric film 3, the intermediate electrode 9, and a shim layer 83. The upper electrode 2 and the intermediate electrode 4 have a structure similar to that of the piezoelectric resonator 10 of the first embodiment. When a positive voltage is applied to between the upper electrode 2 and the intermediate electrode 4, while the upper piezoelectric film 3 contracts in the X-axis direction, the shim layer 83 does not deform, and therefore, a vibrating beam 81A bends in the +Z direction. When a negative voltage is applied to between the upper electrode 2 and the intermediate electrode 4, the vibrating beam 81A bends in the −Z direction. Thus, if an alternate voltage is applied to between the upper electrode 2 and the intermediate electrode 4, vibration is generated. When the frequency of the alternate voltage is equal to the resonance frequency of the piezoelectric bending resonator, the maximum amplitude is obtained.

As described above, the piezoelectric bending resonator 81 having the asymmetric bimorph structure in the present embodiment is driven only by the expansion and contraction of the upper piezoelectric film 3, and therefore, the driving efficiency is approximately half of the piezoelectric bending resonator 10 having the symmetric bimorph structure shown in the first embodiment. However, the asymmetric bimorph structure have advantages in that, relative to the symmetric bimorph structure having five layers, the asymmetric bimorph structure having four layers to allow the number of layers to be reduced by one, and a shim layer can be formed of materials other than a piezoelectric film.

The shim layer may be formed of a silicon oxide film, a silicon nitride film, and a polycrystalline silicon film used in a general silicon process.

Although the present embodiment shows the piezoelectric bending resonator having one vibrating beam, the piezoelectric bending resonator having two vibrating beams of the first variation of the first embodiment and the piezoelectric bending resonator having three vibrating beams of the second variation of the first embodiment may obviously have the asymmetric bimorph structure exactly as with the present embodiment. In each vibrating beam, a single shim layer 83 may be replaced by the lower piezoelectric films 5 and 6.

The first to fifth embodiments can be obviously applied as it is to the entire structure of the acceleration sensor except for the piezoelectric bending resonator, and the details are omitted to avoid repetition.

(Seventh Embodiment)

In general, with regard to the resonance frequency of the piezoelectric bending resonator having supported both ends, by virtue of a hard spring effect, when the amplitude increases, the resonance frequency slightly increases. Thus, when the resonance frequency is measured extremely precisely, the amplitude should be controlled constant.

An acceleration sensor of the seventh embodiment has a mechanism monitoring amplitude in addition to an excitation mechanism of the piezoelectric bending resonators described in detail in the first to fifth embodiments and uses a constant amplitude piezoelectric bending resonator added with a mechanism which feedback-controls the amplitude detected by the monitoring mechanism and keeps the amplitude of the piezoelectric bending resonator constant.

Figure 22:
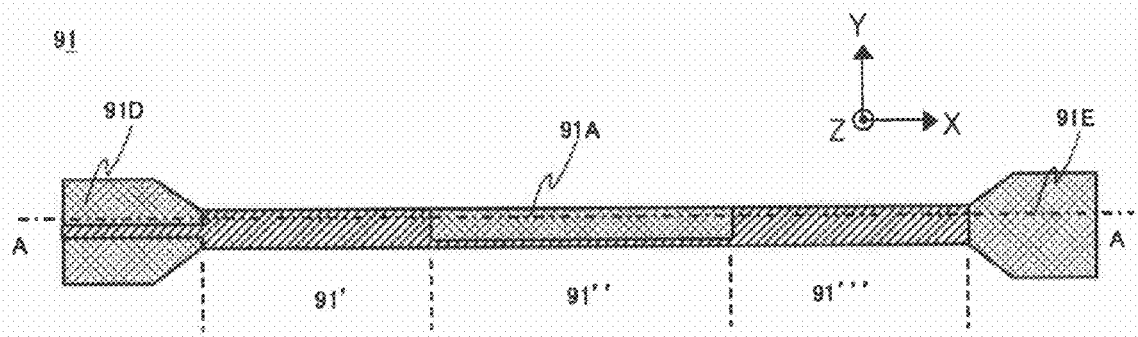
FIG. 22 is a top view of a piezoelectric bending resonator of an acceleration sensor according to a seventh embodiment.
Figure 23:
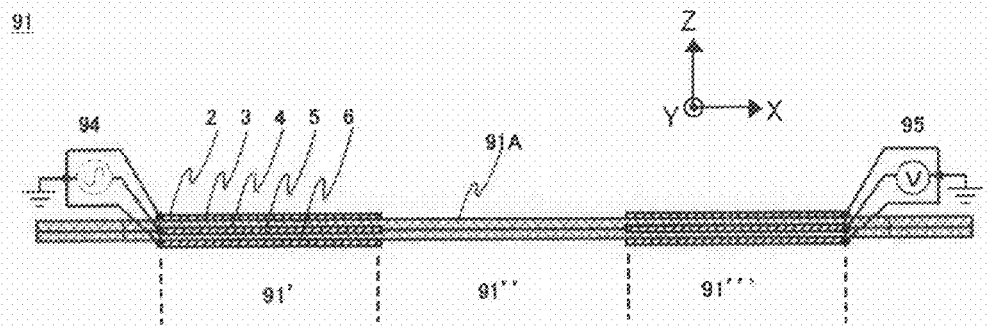
FIG. 23 is a sectional side view of the piezoelectric bending resonator taken along a line A-A of FIG. 22.

FIG. 22 is a top view of a piezoelectric bending resonator in the seventh embodiment, and FIG. 23 is an A-A sectional side view of FIG. 22.

A piezoelectric bending resonator 91 in the present embodiment is constituted of five layers of an upper electrode 2, an upper piezoelectric film 3, and an intermediate electrode 4, a lower piezoelectric film 5, and a lower electrode 6. The upper electrode 2 and the lower electrode 6 are formed on the entire surface in first and third portions 91' and 91'''. In a second portion 91'', only a wiring portion for connecting the first and third portions 91' and 91''' is formed. Meanwhile, although the intermediate electrode 4 is formed on the entire surface in the first and third portions 91' and 91''', there is no wiring portion for connection in the second portion 91'' (not shown), and the first and third portions 91' and 91''' are independent.

Only in the first portion 91', an alternate voltage is applied by a resonance circuit 94 is applied to between the upper electrode 2 or the lower electrode 6 and the intermediate electrode 4, and a vibrating beam 91A is excited by a piezoelectric inverse effect. At this time, the vibrating beam 91A generates resonance in the Z direction axisymmetrically with respect to the Y axis, and accompanying this, in the third portion 91''', an alternate voltage is induced between the upper electrode 2 or the lower electrode 6 and the intermediate electrode 4 by the piezoelectric effect. A voltage amplitude induced in the third portion 91''' can be measured by a monitor circuit 95.

Figure 24:
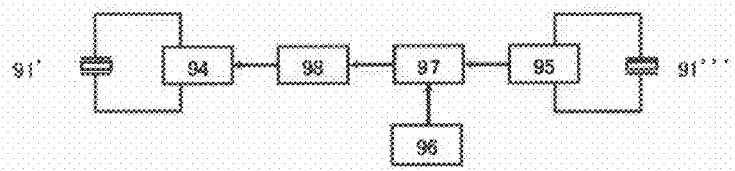
FIG. 24 is a block diagram of an amplitude feedback circuit used in the acceleration sensor according to the seventh embodiment.

FIG. 24 is a block diagram of an amplitude feedback circuit based on the present embodiment. Reference numeral 94 denotes a voltage control oscillation circuit, 95 denotes a monitor circuit, 96 denotes a reference voltage generator, 97 denotes a comparison circuit, and 98 denotes a loop filter. The first portion 91' of the vibrating beam 91A is excited by the oscillation circuit 94, and the resonance vibration is transmitted to the third portion 91'''. The amplitude of the resonance is measured as the voltage amplitude by the monitor circuit 95. The amplitude voltage is compared with a reference voltage from the reference voltage generator 96 in the comparison circuit 97, low-frequency components of a difference voltage are input to the voltage control oscillation circuit 94 through the loop filter 98, and a feedback control is performed so that the resonance amplitude has a constant value.

Since the piezoelectric bending resonator 91 is excited by a constant amplitude, the piezoelectric bending resonator 91 has a stable constant resonance frequency, and the change of resonance frequency with respect to acceleration can be extremely accurately measured.

Although the present embodiment shows the piezoelectric bending resonator having one vibrating beam, the piezoelectric bending resonator having two vibrating beams of the first variation of the first embodiment and the piezoelectric bending resonator having three vibrating beams of the second variation of the first embodiment may obviously have the constant amplitude piezoelectric bending resonator structure exactly as with the present embodiment. In the piezoelectric bending resonator having two or three vibrating beams, only one of the vibrating beams may have the monitoring mechanism according to the present embodiment, or all the two or three vibrating beams may have the monitoring mechanism according to the present embodiment.

The first to fifth embodiments can be obviously applied as it is to the entire structure of the acceleration sensor except for the piezoelectric bending resonator, and the details are omitted to avoid repetition.

(First Variation of Seventh Embodiment)

In the seventh embodiment, there has been described the constant amplitude piezoelectric bending resonator which is characterized by having the excitation mechanism in first portion of the vibrating beam and having the amplitude monitoring mechanism in the third portion.

On the other hand, an acceleration sensor in a first variation of the seventh embodiment using the constant amplitude piezoelectric bending resonator is characterized by applying an excitation voltage to between an upper electrode and an intermediate electrode of a vibrating beam and connecting an amplitude monitoring mechanism to a lower electrode and the intermediate electrode.

Figure 25:
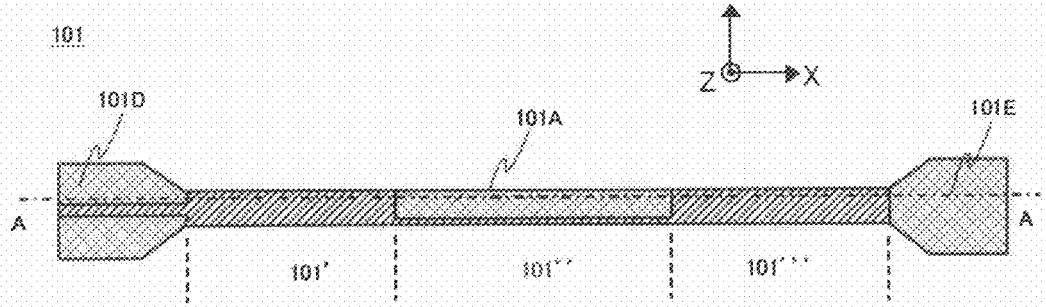
FIG. 25 is a top view of a piezoelectric bending resonator of an acceleration sensor according to a first variation of the seventh embodiment.
Figure 26:
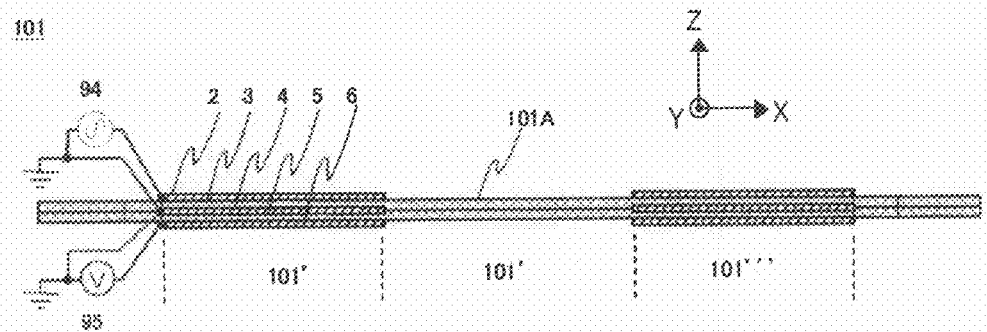
FIG. 26 is a sectional side view of the piezoelectric bending resonator taken along a line A-A of FIG. 25.

FIG. 25 is a top view of a piezoelectric bending resonator 101 in the first variation of the seventh embodiment, and FIG. 26 is an A-A sectional side view of FIG. 25.

The piezoelectric bending resonator 101 in this variation is constituted of five layers of an upper electrode 2, an upper piezoelectric film 3, and an intermediate electrode 4, a lower piezoelectric film 5, and a lower electrode 6, and the basic structure is the same as that of the piezoelectric bending resonator 11 of the first embodiment. However, while in the piezoelectric bending resonator 11 of the first embodiment, the excitation voltage is applied to between the upper and lower electrodes 2 and 6 and the intermediate electrode 4, in this variation, the excitation voltage is applied to between the upper electrode 2 and the intermediate electrode 4, and the voltage amplitude between the lower electrode 6 and the intermediate electrode 4 is measured by the monitor circuit. Namely, in this variation, although the piezoelectric bending resonator 101 has the symmetric bimorph structure, only the upper piezoelectric film 3 is used as a piezoelectric film for driving, and asymmetric bimorph drive is performed actually. The lower piezoelectric film 5 is used as a piezoelectric film for vibration detection.

Although the seventh embodiment and the first variation of the seventh embodiment are different in drive electrode configuration and monitor electrode configuration, the basic operation and circuits are exactly the same, and the feedback circuit shown in FIG. 24 may be used in this variation.

According to the above constitution, since the piezoelectric bending resonator 101 is excited by a constant amplitude, the piezoelectric bending resonator 101 has a stable constant resonance frequency, and the change of resonance frequency with respect to acceleration can be extremely accurately measured.

Although this variation shows the piezoelectric bending resonator having one vibrating beam, the piezoelectric bending resonator having two vibrating beams of the first variation of the first embodiment and the piezoelectric bending resonator having three vibrating beams of the second variation of the first embodiment may obviously have the constant amplitude piezoelectric bending resonator structure exactly as with the sixth embodiment. In the piezoelectric bending resonator having two or three vibrating beams, only one of the vibrating beams may have the monitoring mechanism according to this variation, or all the two or three vibrating beams may have the monitoring mechanism according to this variation.

The first to fifth embodiments can be obviously applied as it is to the entire structure of the acceleration sensor except for the piezoelectric bending resonator, and the details are omitted to avoid repetition.

(Second Variation of Seventh Embodiment)

In the seventh embodiment and the first variation of the seventh embodiment, there has been described the constant amplitude piezoelectric bending resonator applicable to the piezoelectric bending resonator having only one vibrating beam.

On the other hand, an acceleration sensor of the second variation of the seventh embodiment can be applied only to the piezoelectric bending resonator having a plurality of vibrating beams and uses the constant amplitude piezoelectric bending resonator.

Figure 27:
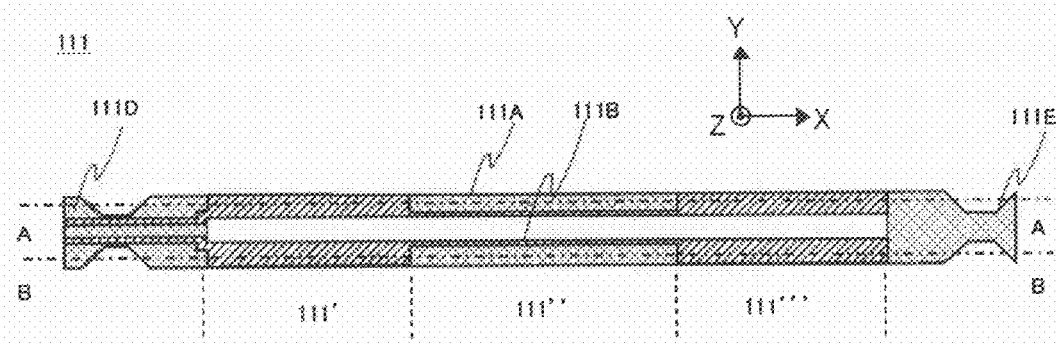
FIG. 27 is a top view of a piezoelectric bending resonator of an acceleration sensor according to a second variation of the seventh embodiment.
Figure 28:
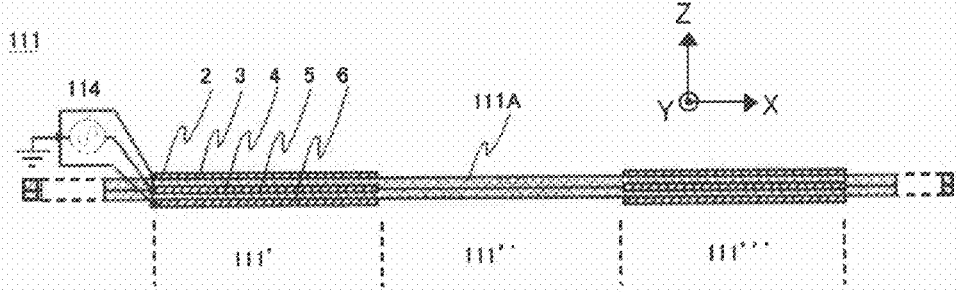
FIG. 28 is a sectional side view of the piezoelectric bending resonator taken along a line A-A of FIG. 27.
Figure 29:
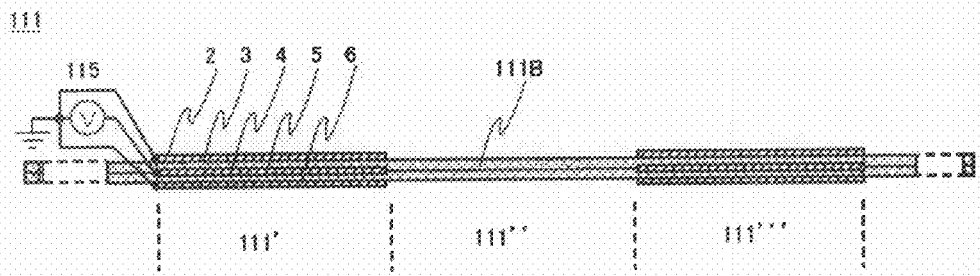
FIG. 29 is a sectional side view of the piezoelectric bending resonator taken along a line B-B of FIG. 27.

FIG. 27 is a top view of a piezoelectric bending resonator 111 in the second variation of the seventh embodiment. FIG. 28 is an A-A sectional side view of FIG. 27. FIG. 29 is a B-B sectional side view of FIG. 27.

The piezoelectric bending resonator 111 in this variation has two vibrating beams 111A and 111B constituted of five layers of an upper electrode 2, an upper piezoelectric film 3, and an intermediate electrode 4, a lower piezoelectric film 5, and a lower electrode 6, and the basic structure is the same as that of the piezoelectric bending resonator 21 of the first variation of the first embodiment. However, while in the piezoelectric bending resonator 21 of the first variation of the first embodiment, a driving voltage in opposite phase is applied to the first and second vibrating beams 21A and 21B, in this variation, the excitation voltage is applied only to the first vibrating beam 111A as shown in FIG. 28, and the voltage amplitude occurs in the second vibrating beam 111B is measured by a monitor circuit as shown in FIG. 29.

In the piezoelectric bending resonator 111 having the two vibrating beams, when a driving voltage is applied only to the first vibrating beam 111A, and the first vibrating beam 111A resonances, the resonance opposite in phase and equal in amplitude is excited in the second vibrating beam 111B so as to offset the momentum, and therefore, a voltage based on the piezoelectric effect is excited between electrodes of the second vibrating beam 111B, so that the amplitude can be monitored.

Although the seventh embodiment, the first variation of the seventh embodiment, and this variation are different in drive electrode configuration and monitor electrode configuration, the basic operation and circuits are exactly the same, and the feedback circuit shown in FIG. 24 may be used in this variation.

According to the above constitution, since the piezoelectric bending resonator 111 is excited by a constant amplitude, the piezoelectric bending resonator 111 has a stable constant resonance frequency, and the change of resonance frequency with respect to acceleration can be extremely accurately measured.

Although this variation shows the piezoelectric bending resonator having two vibrating beams, the piezoelectric bending resonator having three vibrating beams of the second variation of the first embodiment may obviously have the constant amplitude piezoelectric bending resonator structure exactly as with this variation. In the piezoelectric bending resonator having three vibrating beams, two of the three vibrating beams are used as an excitation mechanism, and the remaining one may have the monitoring mechanism according to this variation. Alternatively, one of the three vibrating beams is used as the excitation mechanism, and the remaining two may have the monitoring mechanism according to this variation.

The first to fifth embodiments can be obviously applied as it is to the entire structure of the acceleration sensor except for the piezoelectric bending resonator, and the details are omitted to avoid repetition.

(Eighth Embodiment)

In the acceleration sensors described in the first to seventh embodiments, the inertia force applied to the proof mass is measured as the change of the resonance frequency of the piezoelectric bending resonator.

An acceleration sensor of the eighth embodiment is of a so-called force feedback type. Although the acceleration sensor is the same as one described in detail in the first to seventh embodiments, a feedback circuit for eliminating the inertia force applied to a proof mass and a proof mass driving mechanism (proof mass driving beam) are added to the acceleration sensor.

In the force feedback type of acceleration sensor, the maximum advantage is that a response to acceleration is basically linear. Since the proof mass does not move, the acceleration sensor is characterized by highly durable. The proof mass driving mechanism can be created simultaneously with a piezoelectric bending resonator for detecting an inertia force, and therefore, there is no such a problem that process is added. Only a force feedback circuit may be added.

Figure 30:
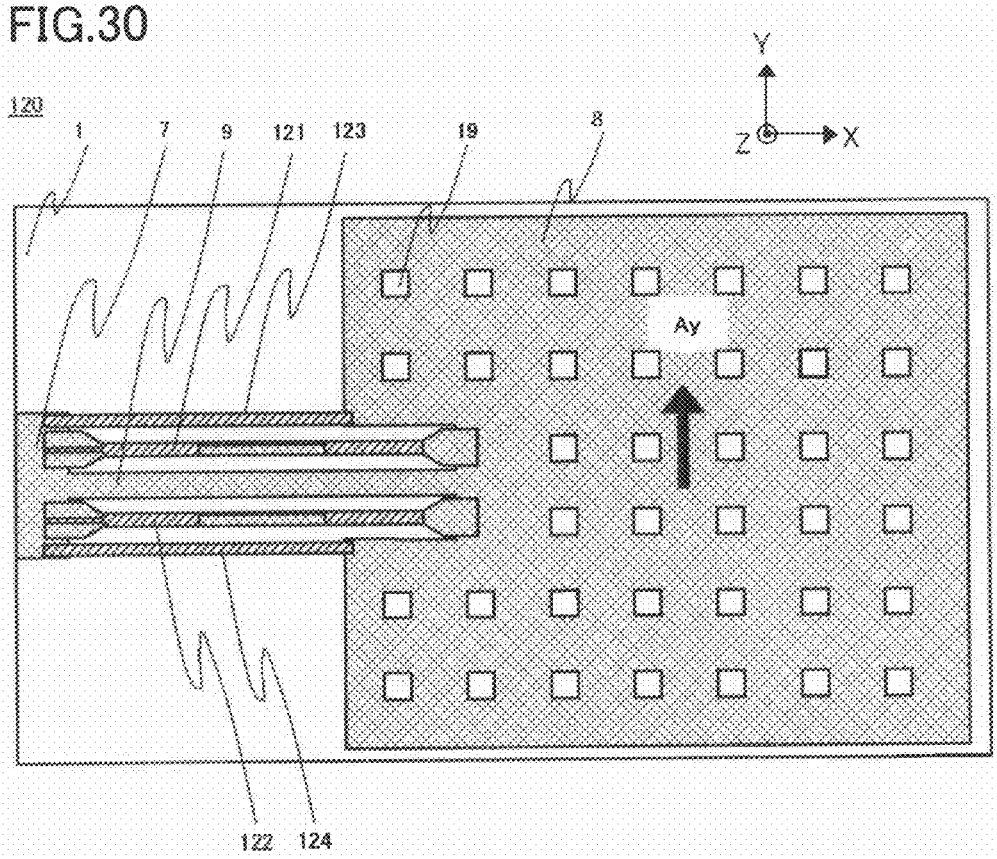
FIG. 30 is a top view of an acceleration sensor according to an eighth embodiment.

FIG. 30 is a top view of an acceleration sensor 120 for single-axis detection of the eighth embodiment. As described above, the acceleration sensor body is the same as the acceleration sensor 10 shown in the first embodiment, and first and second proof mass driving mechanisms (proof mass driving beams) 123 and 124 are added to the acceleration sensor body. The respective one ends of the first and second proof mass driving mechanisms 123 and 124 are connected to the upper surface of a anchor portion 7, and the other ends are connected to the upper surface of the proof mass 8.

It is preferable that the proof mass driving mechanisms 123 and 124 do not interfere with the movement of the proof mass 8 by an inertia force as little as possible. Namely, when a distance from the proof mass driving mechanisms 123 and 124 to a support beam 9 is large, or when the proof mass driving mechanisms 123 and 124 have an extremely large width, the movement of the proof mass is interfered, and therefore it is not preferable.

Since the other structure is similar to that of the acceleration sensor 10, the detailed description is omitted. In the present embodiment, it is preferable that the first and second piezoelectric bending resonators 121 and 122 have the same length.

Figure 31:
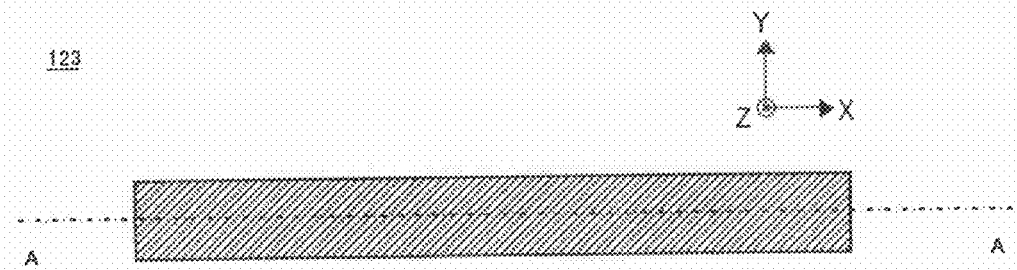
FIG. 31 is a top view of a proof mass driving mechanism of the acceleration sensor according to the eighth embodiment.
Figure 32:
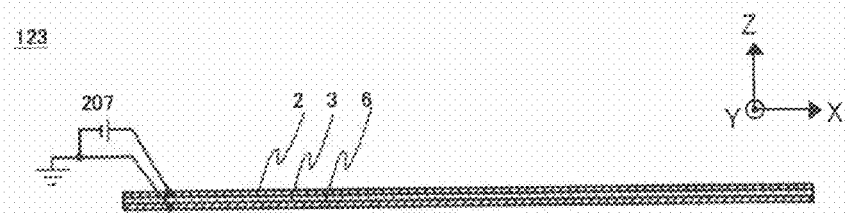
FIG. 32 is a sectional side view of the proof mass driving mechanism taken along a line A-A of FIG. 31.

FIG. 31 is a top view of the proof mass driving mechanism 123, and FIG. 32 is an A-A sectional side view of FIG. 31. The proof mass driving mechanism 123 of the present embodiment is constituted of three layers of an upper electrode (fifth electrode) 2, a piezoelectric film (third electrode) 3, and a lower electrode (sixth electrode) 6. The upper and lower electrodes 2 and 6 are formed on the entire both surfaces of the piezoelectric film 3.

A driving voltage for cancelling an inertia force is applied to between the upper and lower electrodes 2 and 6 by a force feedback circuit to be described, and the expansion force or the compression force is generated in the piezoelectric film 3.

For example, when the inertia force in the +Y direction acts on the proof mass 8, a support beam 9 flexes in the +Y direction around the anchor portion 7 as a fulcrum point, and while the compression force is applied to the first piezoelectric bending resonator 121 in order to reduce the resonance frequency, a tensile force is applied to the second piezoelectric bending resonator 122 in order to increase the resonance frequency. A difference of the resonance frequency between the first piezoelectric bending resonator 121 and the second piezoelectric bending resonator 122 is detected by the force feedback circuit to be described, and while the expansion force eliminating this is generated in the piezoelectric film 3 of the first proof mass driving mechanism 123, a contraction force is generated in the piezoelectric film 3 of the second proof mass driving mechanism 124, whereby the inertia force applied to the proof mass 8 is eliminated, and the proof mass can be held at a substantially constant position. A proof mass driving voltage generated at that time is proportional to the magnitude of the inertia force.

Figure 33:
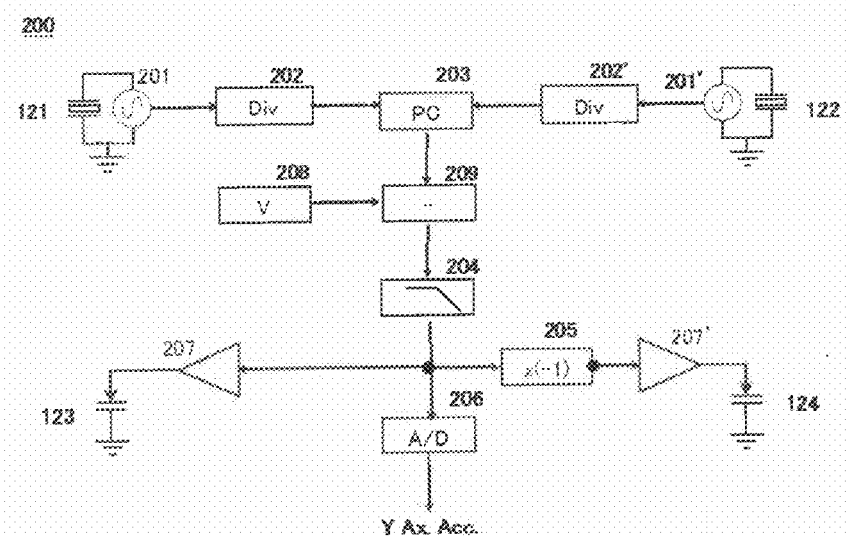
FIG. 33 is a block diagram of a force feedback circuit used in the acceleration sensor according to the eighth embodiment.

FIG. 33 is a block diagram of a force feedback circuit 200 based on the present embodiment. Reference numeral 201 denotes an oscillation circuit, 202 denotes a divider, 203 denotes a phase comparison circuit, 204 denotes a loop filter, 205 denotes a polarity inverter, 206 denotes an A/D convertor, 207 denotes an amplifier for driving, 208 denotes a voltage generation circuit, and 209 denotes a subtracter. By means of the oscillation circuit 201, an alternate voltage is applied to between the upper electrode 2, the lower electrode 6, and the intermediate electrode 4 of the first or second piezoelectric bending resonator 121 or 122, and the resonance occurs. The resonance frequencies are converted into low frequencies by the dividers 202 and 202' and converted into a voltage corresponding to a phase difference by the phase comparison circuit 203. Meanwhile, a voltage corresponding to an output voltage of the divider 202, corresponding to a difference of the resonance frequency between the first and second piezoelectric bending resonators 121 and 122 under no-load conditions where no acceleration is applied, is output from the voltage generation circuit 208, and a difference between the output of the divider 202 and the output of the voltage generation circuit 208 is output from the subtracter 209. The output is filtered by the loop filter 204, and one of the output passes through the amplifier 207 to be applied as a driving voltage to between the upper and lower electrodes 2 and 6 of the first proof mass driving mechanism 123. With regard to the other output of the loop filter 204, the polarity of the output is inverted by the polarity inverter 205 to thereafter pass through an amplifier 207' for driving, and, thus, to be applied as a driving voltage to between the upper and lower electrodes 2 and 6 of the second proof mass driving mechanism 124.

According to the above constitution, force feedback control is performed so as to prevent the proof mass 8 from being moved by the inertia force.

In FIG. 33, there has been described the case in which the resonance frequencies of the first and second piezoelectric bending resonators 121 and 122 are different under no-load conditions. When the resonance frequencies are the same, the voltage generation circuit 208 and the subtracter 209 are not obviously required.

According to the above constitution, the piezoelectric bending resonator 121 or 122 is excited at a constant resonance frequency, and the magnitude of the inertia force is measured by the driving voltage required for force feedback, whereby the acceleration can be measured linearly with an extremely high sensitivity.

When a proof mass with a size of 500×500×15 μm, a support beam with a size of 180×6×15 μm, a piezoelectric bending resonator 1 (TF1) with a size of 180×20×0.3 μm, a piezoelectric bending resonator 2 (TF2) with a size of 160× 20×0.3 μm, and first and second piezoelectric driving mechanisms with a size of 120×20×0.3 μm are used, a voltage of about 1V is applied to the piezoelectric driving mechanism relative to acceleration of 10G applied to the proof mass, whereby the force feedback can be achieved.

Although the present embodiment shows the piezoelectric bending resonator having one vibrating beam, the piezoelectric bending resonator having two vibrating beams of the first variation of the first embodiment and the piezoelectric bending resonator having three vibrating beams of the second variation of the first embodiment may obviously have the force feedback type acceleration sensor structure exactly as with the present embodiment.

The force feedback mechanism of the present embodiment and the constant amplitude piezoelectric bending resonator structure described in the seventh embodiment may be obviously combined.

(Ninth Embodiment)

The force feedback type of acceleration sensor shown in the eighth embodiment is the acceleration sensor having the proof mass driving mechanism added outside the support beam and the piezoelectric bending resonator. In the present embodiment, it is characterized that the proof mass driving mechanism is incorporated in a portion of a piezoelectric bending resonator for measurement.

Figure 34:
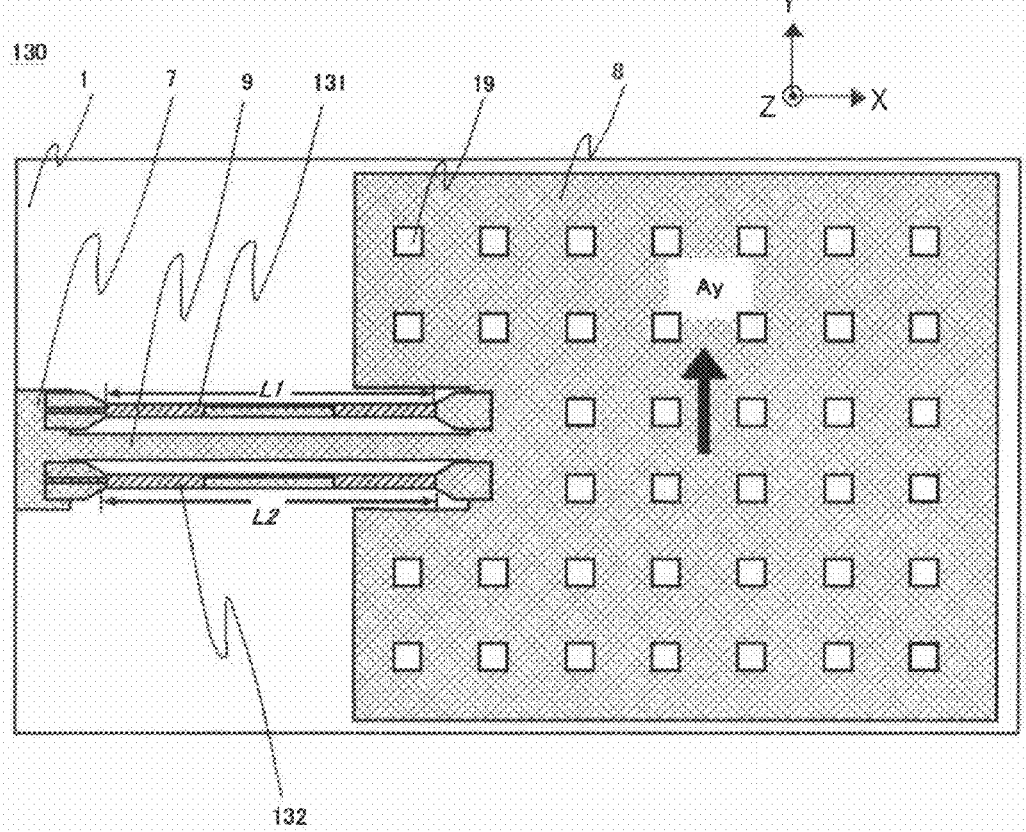
FIG. 34 is a top view of an acceleration sensor according to a ninth embodiment.

FIG. 34 is a top view of a force feedback type of acceleration sensor 130 for single-axis detection according to a ninth embodiment. The structure of the acceleration sensor body except for the inner structures of piezoelectric bending resonators 131 and 132 used in the present embodiment is similar to that of the acceleration sensor 10 shown in the first embodiment, and the detailed description is omitted. In the case of the present embodiment, it is preferable that the first and second piezoelectric bending resonators 131 and 132 have the same length.

Figure 35:
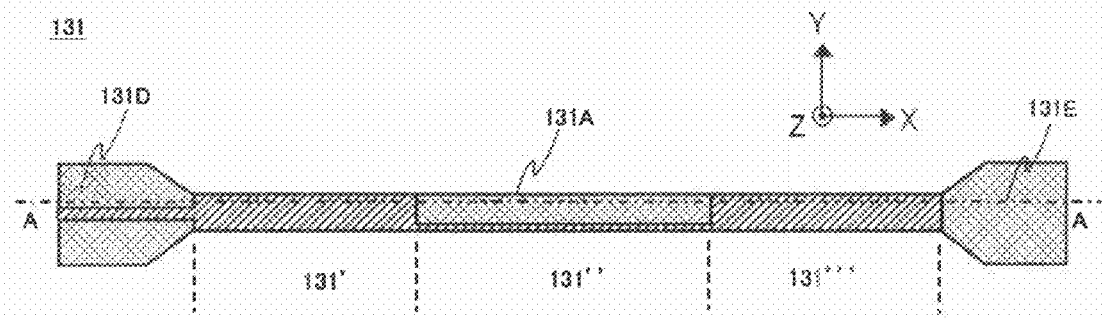
FIG. 35 is a top view of a piezoelectric bending resonator of the acceleration sensor according to the ninth embodiment.
Figure 36:
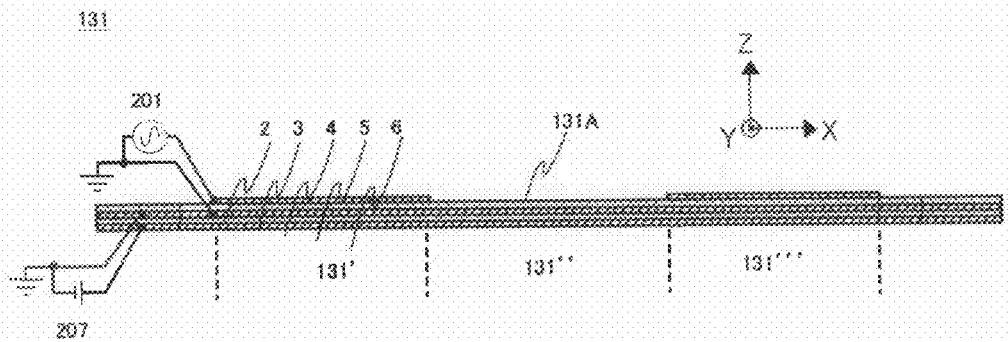
FIG. 36 is sectional side view of the piezoelectric bending resonator taken along a line A-A of FIG. 35.

FIG. 35 is a top view of the piezoelectric bending resonator 131, and FIG. 36 is an A-A sectional side view of FIG. 35. The piezoelectric bending resonator 131 of the present embodiment is constituted of five layers of an upper electrode 2, an upper piezoelectric film 3, and an intermediate electrode 4, a lower piezoelectric film 5, and a lower electrode 6. A vibrating beam 131A of the piezoelectric bending resonator 131 is divided into first to third portions 131', 131", and 131''' from a first support end 131D to a second support end 131E.

The upper electrode 2 is formed on the entire surface in the first and third portions 131' and 131''', and in the second portion 131", only a wiring portion for connecting the first or third portion 131' or 131''' is formed. Meanwhile, the intermediate electrode 4 and the lower electrode 6 are formed on the entire surface in the first to third portions 131', 131", and 131'''.

When an alternate voltage is applied to between the upper electrode 2 and the intermediate electrode 4 by a resonance circuit 201, the vibrating beam 131A is excited by the piezoelectric inverse effect.

Meanwhile, in the force feedback circuit 200, a proof mass driving voltage is applied from the amplifier 207 for cancelling an inertia force to between the lower electrode 6 and the intermediate electrode 4, and an expansion force or a compression force is generated in the lower piezoelectric film 5.

For example, when the inertia force Ay in the +Y direction acts on a proof mass 8, a support beam 9 flexes in the +Y direction around a anchor portion 7 as a fulcrum point, and while the compression force is applied to the first piezoelectric bending resonator 131 in order to reduce the resonance frequency, a tensile force is applied to the second piezoelectric bending resonator 132 in order to increase the resonance frequency. A difference of the resonance frequency between the first piezoelectric bending resonator 131 and the second piezoelectric bending resonator 132 is detected by the force feedback circuit 200, and while the expansion force eliminating this is generated in the lower piezoelectric film 5 of the first piezoelectric bending resonator 131, a contraction force is generated in the lower piezoelectric film 5 of the second piezoelectric bending resonator 132, whereby the inertia force applied to the proof mass 8 is eliminated, and the proof mass 8 can be held at a substantially constant position. A proof mass driving voltage generated at that time is proportional to the magnitude of the inertia force.

According to the above constitution, the piezoelectric bending resonator 131 or 132 is excited at a constant resonance frequency, and the magnitude of the inertia force is measured by the driving voltage required for force feedback, whereby the acceleration can be measured linearly with an extremely high sensitivity.

Although the present embodiment shows the piezoelectric bending resonator having one vibrating beam, the piezoelectric bending resonator having two vibrating beams of the first variation of the first embodiment and the piezoelectric bending resonator having three vibrating beams of the second variation of the first embodiment may obviously have the force feedback type acceleration sensor structure exactly as with the present embodiment. In the piezoelectric bending resonator having two or three vibrating beams, only one of the vibrating beams may have the force feedback driving mechanism according to the present embodiment, or all the two or three vibrating beams may have the force feedback driving mechanism according to the present embodiment.

The force feedback mechanism of the present embodiment and the constant amplitude piezoelectric bending resonator structure described in the seventh embodiment can be obviously combined. In this case, especially preferred are the combination of the present embodiment and the seventh embodiment and the combination of the present embodiment and the second variation of the seventh embodiment.

(Tenth Embodiment)

The eighth and ninth embodiments show the examples of the force feedback type of acceleration sensor for single-axis direction. A tenth embodiment describes an example in which the acceleration sensor 40 for biaxial detection described in the second embodiment is of the force feedback type.

Figure 37:
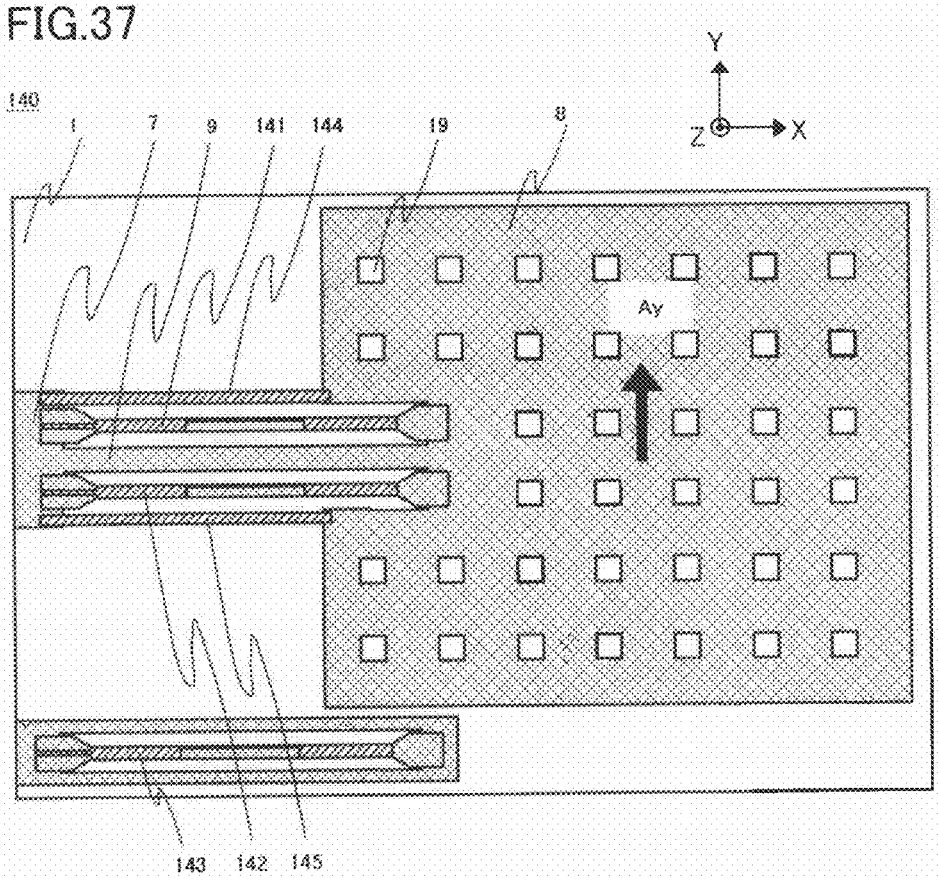
FIG. 37 is a top view of an acceleration sensor according to a tenth embodiment.

FIG. 37 is a top view of a force feedback type of acceleration sensor 140 for biaxial detection according to the tenth embodiment. The acceleration sensor 140 has not only first and second measuring piezoelectric bending resonators 141 and 142 but also a referential piezoelectric bending resonator 143. The acceleration sensor 140 further has first and second proof mass driving mechanisms 144 and 145. The respective one ends of the first and second proof mass driving mechanisms 144 and 145 are connected to the upper surface of a anchor portion 7, and the other ends are connected to the upper surface of a proof mass 8. Since the first and second proof mass driving mechanisms 144 and 145 are similar to the proof mass driving mechanism 123 described in the eighth embodiment, the detailed description will be omitted. Since other structures are similar to those of the acceleration sensor 40, the detailed description will be omitted. In the case of the present embodiment, it is preferable that the first to third piezoelectric bending resonators 141, 142, and 143 have the same length.

When an inertia force in the Y direction acts on the proof mass 8, the force feedback operation is basically the same as that in the ninth embodiment, and therefore, the detailed description will be omitted.

Next, when an inertia force in the +Z direction acts on the proof mass 8, a support beam 9 flexes in the +Z direction around the anchor portion 7 as a fulcrum point, and a compression force is applied to the first and second piezoelectric bending resonators 141 and 142 in order to reduce the resonance frequency. A difference between the average of the resonance frequencies of the first and second piezoelectric bending resonators 141 and 142 and the resonance frequency of the referential piezoelectric bending resonator 143 is detected by the force feedback circuit to be described, and the expansion force eliminating this is generated in the piezoelectric film 3 of the first or second proof mass driving mechanism 144 or 145, whereby the inertia force applied to the proof mass 8 is eliminated, and the proof mass 8 can be held at a constant position. A proof mass driving voltage generated at that time is proportional to the magnitude of the inertia force in the Z-axis direction.

Figure 38:
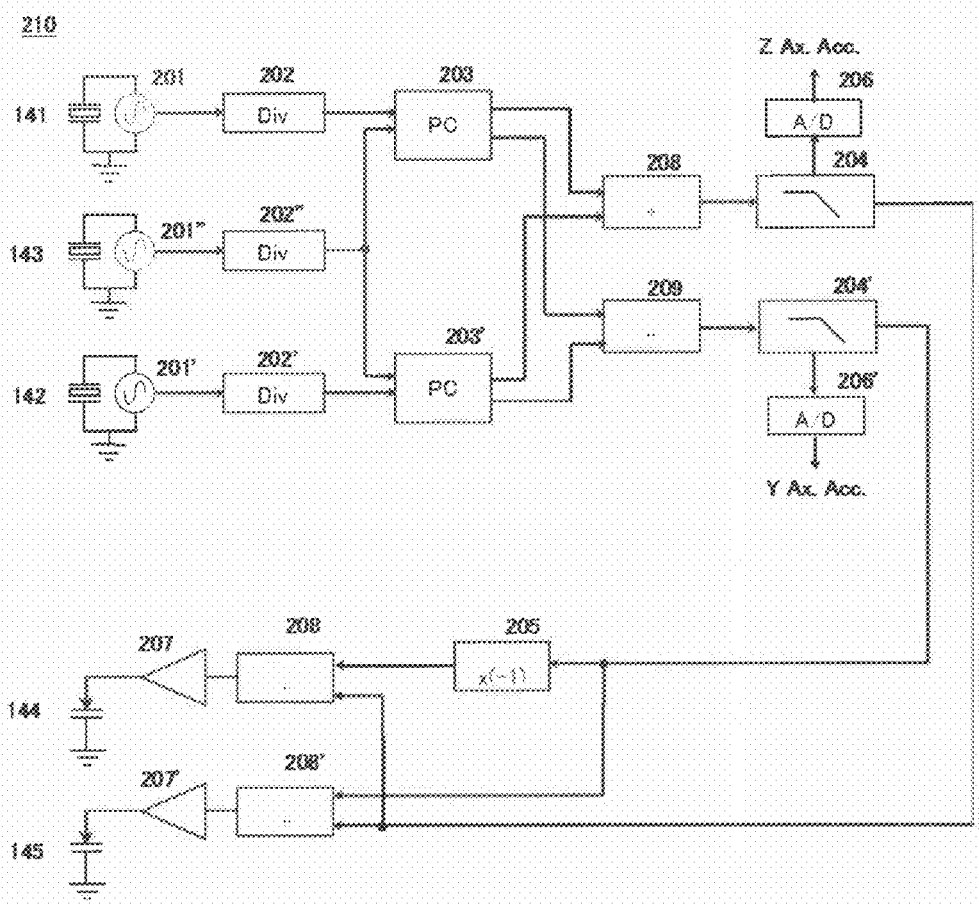
FIG. 38 is a block diagram of a force feedback circuit used in the acceleration sensor according to the tenth embodiment.

FIG. 38 is a block diagram of a biaxial force feedback circuit 210 based on the present embodiment. Reference numeral 201 denotes an oscillation circuit, 202 denotes a divider, 203 denotes a phase comparator, 208 denotes an adder, 209 denotes a subtracter, 204 denotes a loop filter, 205 denotes a polarity inverter, 206 denotes an A/D convertor, and 207 denotes an amplifier for driving.

The oscillation circuits 201, 201', and 201" apply an alternate voltage to the first or second measuring piezoelectric bending resonators 141 and 142 and the referential piezoelectric bending resonator 143, and the resonance occurs. The respective resonance frequencies are converted into low frequencies by the dividers 202, 202', and 202", the phase of the first measuring piezoelectric bending resonator 141 and the phase of the referential piezoelectric bending resonator 143 are compared by the phase comparator 203, or the phase of the second measuring piezoelectric bending resonator 142 and the phase of the referential piezoelectric bending resonator 143 are compared by the phase comparator 203', and the phase difference is converted into a voltage.

As a signal corresponding to the inertia force in the Z-axis direction, a phase difference voltage of the first measuring piezoelectric bending resonator 141 and the referential piezoelectric bending resonator 143 and a phase difference voltage of the second measuring piezoelectric bending resonator 142 and the referential piezoelectric bending resonator 143 are added by the adder 208 to be filtered by the loop filter 204. Thereafter, the filtered voltage is digitized by the A/D convertor 206 to be a measurement value of the inertia force in the Z-axis direction.

Meanwhile, as a signal corresponding to the inertia force in the Y-axis direction, the phase difference voltage of the first measuring piezoelectric bending resonator 141 and the referential piezoelectric bending resonator 143 and the phase difference voltage of the second measuring piezoelectric bending resonator 142 and the referential piezoelectric bending resonator 143 are subtracted by the subtracter 209 to be filtered by the loop filter 204'. Thereafter, the filtered voltage is digitized by the A/D convertor 206' to be a measurement value of the inertia force in the Y-axis direction.

The output voltage of the loop filter 204 corresponding to the Z-axis inertia force is supplied to the two adders 208 and 208' to pass through the amplifier 207 and 207' and, thus, to be applied as a driving voltage to the first and second proof mass driving mechanisms 144 and 145.

With regard to one of the output voltages of the loop filter 204' corresponding to the Y-axis inertia force, the polarity of the output is inverted by the polarity inverter 205 and thereafter supplied to the adder 208. The output voltage then passes through the amplifier 207 to be applied as a driving voltage to the first proof mass driving mechanism 144. At the same time, the other output voltage of the loop filter 204' corresponding to the Y-axis inertial force is supplied directly to the adder 208' to pass through the amplifier 207', and, thus, to be applied as a driving voltage to the second proof mass driving mechanism 145.

According to the above constitution, the resonator 8 is force-feedback controlled in order to prevent from being moved by the inertia forces in the Y and Z axis directions.

According to the above constitution, the measuring piezoelectric bending resonator 141 or 142 resonates with the referential piezoelectric bending resonator 143 at the same resonance frequency, and the magnitude of the inertia force is measured by the driving voltage required for the force feedbacks in the Y and Z axis directions, whereby the acceleration can be measured linearly with an extremely high sensitivity.

Although the present embodiment shows the piezoelectric bending resonator having one vibrating beam, the piezoelectric bending resonator having two vibrating beams of the first variation of the first embodiment and the piezoelectric bending resonator having three vibrating beams of the second variation of the first embodiment may obviously have the biaxial force feedback type acceleration sensor structure exactly as with the present embodiment.

The force feedback mechanism of the present embodiment and the constant amplitude piezoelectric bending resonator structure described in the seventh embodiment may be obviously combined.

(Eleventh Embodiment)

Figure 39:
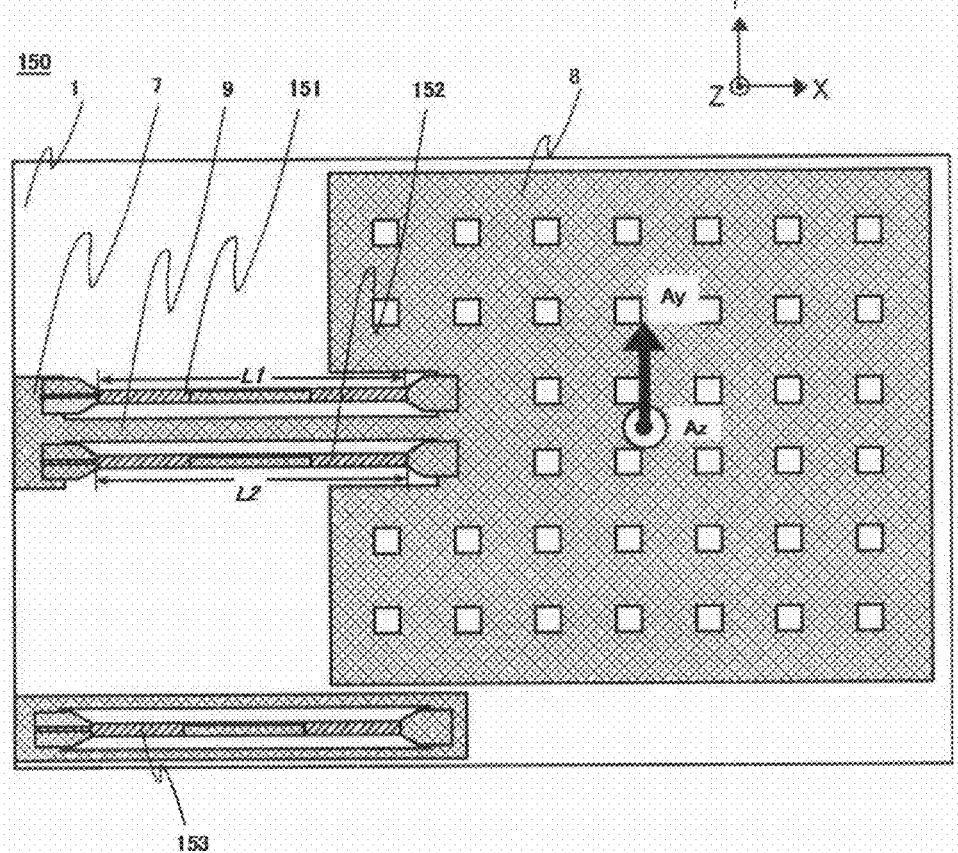
FIG. 39 is a top view of an acceleration sensor according to an eleventh embodiment.

The force feedback type of biaxial acceleration sensor shown in the tenth embodiment is the acceleration sensor having the proof mass driving mechanism added outside the support beam and the piezoelectric bending resonator. In the present embodiment, it is characterized that the proof mass driving mechanism is incorporated in a portion of a piezoelectric bending resonator for measurement FIG. 39 is a top view of a force feedback type of acceleration sensor 150 for biaxial detection according to the eleventh embodiment. The structure of the acceleration sensor body except for the inner structures of measuring piezoelectric bending resonators 151 and 152 used in the present embodiment is similar to that of the acceleration sensor 40 of the second embodiment, and the detailed description will be omitted. In the case of the present embodiment, it is preferable that the first and second measuring piezoelectric bending resonators 151 and 152 have the same length.

Since the first and second measuring piezoelectric bending resonators 151 and 152 are similar to the measuring piezoelectric bending resonator 131 incorporated with the proof mass driving mechanism in the ninth embodiment, the detailed description will be omitted. Although a referential piezoelectric bending resonator 153 may not necessarily have the structures of the intermediate and lower electrodes 4 and 6 for proof mass driving in the measuring piezoelectric bending resonator 151, it is preferable that the resonance frequency of the referential piezoelectric bending resonator 153 corresponds to the resonance frequencies of the measuring piezoelectric bending resonators 151 and 152, and therefore, the measuring piezoelectric bending resonators 151 and 152 and the referential piezoelectric bending resonator 153 preferably have the same electrode structure.

When the inertia force in the Y or Z direction acts on the proof mass 8, the force feedback operation is basically the same as that in the tenth embodiment, and therefore, the detailed description will be omitted. A force feedback circuit used in the present embodiment is similar to that of FIG. 38 in the tenth embodiment. The only difference in the present embodiment is that a proof mass driving voltage is applied to between the lower and intermediate electrodes 4 and 6 of the first or second piezoelectric bending resonator 151 or 152. Namely, the lower electrode 6, a lower piezoelectric film 5, and the intermediate electrode 4 of the first or second piezoelectric bending resonator 151 or 152 serve as an equivalent to the upper electrode 2, the piezoelectric film 3, and the lower electrode 6 of the proof mass driving mechanism in the tenth embodiment.

According to the above constitution, the resonator 8 is force-feedback controlled in order to prevent from being moved by the inertia forces in the Y-axis and Z-axis directions.

According to the above constitution, the measuring piezoelectric bending resonator 151 or 152 resonates with the referential piezoelectric bending resonator 153 at the same resonance frequency, and the magnitude of the inertia force is measured by the driving voltage required for the force feedbacks in the Y and Z axis directions, whereby the acceleration can be measured linearly with an extremely high sensitivity.

Although the present embodiment shows the piezoelectric bending resonator having one vibrating beam, the piezoelectric bending resonator having two vibrating beams of the first variation of the first embodiment and the piezoelectric bending resonator having three vibrating beams of the second variation of the first embodiment may obviously have the biaxial force feedback type acceleration sensor structure exactly as with the present embodiment. In the piezoelectric bending resonator having two or three vibrating beams, only one of the vibrating beams may have the force feedback driving mechanism according to the present variation, or all the two or three vibrating beams may have the force feedback driving mechanism according to the present variation.

The force feedback mechanism of the present embodiment and the constant amplitude piezoelectric bending resonator structure described in the seventh embodiment may be obviously combined. In this case, especially preferred are the combination of the present embodiment and the seventh embodiment and the combination of the present embodiment and the second variation of the seventh embodiment.

While certain embodiments have been described, these embodiments have been presented by way of example only, and are not intended to limit the scope of the inventions. Indeed, the acceleration sensor described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. An acceleration sensor comprising:
   a substrate;
   an anchor portion formed on the substrate;
   a support beam having one end connected to the anchor portion and extending spaced apart from the substrate;
   a proof mass being connected to the other end of the support beam and spaced apart from the substrate;
   first and second piezoelectric bending resonators, each having one end connected to the anchor portion and the other end connected to the proof mass or the support beam thereby extending to both sides of the support beam, and each comprising a first electrode, a first piezoelectric film and a second electrode being stacked in a direction perpendicular to the first piezoelectric film to perform bending resonance motion in the direction;
   a first comparison unit configured to output a first value, the first value is a difference of a resonance frequency between the first and second piezoelectric bending resonators; and
   a first calculation unit configured to calculate an acceleration in a direction perpendicular to an extending direction of the support beam from the first value.

2. The acceleration sensor according to claim 1, wherein the first and second piezoelectric bending resonators have a plurality of vibrating beams having a stack of the first electrode, the first piezoelectric film, and the second electrode, the plurality of vibrating beams perform the bending resonance motion in a direction perpendicular to the first piezoelectric film at the same resonance frequency, and the bending resonance motion of one of the plurality of vibrating beams has an opposite phase to the other vibrating beams.

3. The acceleration sensor according to claim 1, further comprising:
   a third piezoelectric bending resonator having a stack of a third electrode, a second piezoelectric film, and a fourth electrode and performs the resonance bending motion in a direction perpendicular to the second piezoelectric film;
   a second comparison unit configured to output a second value, the second value is a difference between an average of the resonance frequencies of the first and second piezoelectric bending resonators and the resonance frequency of the third piezoelectric bending resonator; and
   a second calculation unit configured to calculate an acceleration in a direction perpendicular to the substrate surface from the second value, wherein a distance from a center line of thickness in a direction perpendicular to the substrate of the first and second piezoelectric bending resonators to the substrate is different from a distance from a center line of thickness in a direction perpendicular to the substrate of the support beam to the substrate.

4. The acceleration sensor according to claim 3, wherein the third piezoelectric bending resonator has a plurality of vibrating beams having a stack of the third electrode, the second piezoelectric film, and the fourth electrode, the plurality of vibrating beams perform the resonance bending motion in a direction perpendicular to the second piezoelectric film at the same resonance frequency, and the bending resonance motion of one of the plurality of vibrating beams has an opposite phase to the next vibrating beams.

5. The acceleration sensor according to claim 3, further comprising: another set of the anchor portion, the support beam, the proof mass, and the first and second piezoelectric bending resonators,
  wherein the two support beams are arranged perpendicular to each other.

6. The acceleration sensor according to claim 3, further comprising: another three sets of the anchor portion, the support beam, the proof mass, and the first and second piezoelectric bending resonators,
  wherein the four support beams are arranged to face different directions perpendicular to each other.

7. The acceleration sensor according to claim 1, further comprising:
  first and second proof mass driving beams having one end connected to the anchor portion and the other end connected to the proof mass or the support beam, each of the proof mass driving beams has a stack of a fifth electrode, a third piezoelectric film, and a sixth electrode, the proof mass driving beams extend on the both sides of the support beam, and generates expansion or contraction force in the extending direction by application of a voltage between the fifth and sixth electrodes; and
  a force feedback circuit configured to apply a voltage to the first and second proof mass driving beams so that the first value stays constant.

8. The acceleration sensor according to claim 1, further comprising:
  a force feedback circuit configured to apply a voltage to the first and second piezoelectric bending resonators so that the first value stays constant,
  wherein each of the first and second piezoelectric bending resonators have a fourth piezoelectric film and a seventh electrode further stacked in addition to the first electrode, the first piezoelectric film, and the second electrode, the first electrode and the second electrode being used for excitation and the second electrode and the seventh electrode being used for keeping the first value constant by generating expansion or contraction force in the extending direction of the first and second piezoelectric bending resonator.

9. The acceleration sensor according to claim 3, further comprising:
  first and second proof mass driving beams having one end connected to the anchor portion and the other end connected to the proof mass or the support beam, each of the proof mass driving beams has a stack of a fifth electrode, a third piezoelectric film, and a sixth electrode, the proof mass driving beams extend on the both sides of the support beam, and generates expansion or contraction force in the extending direction by application of a voltage between the fifth and sixth electrodes; and
  a force feedback circuit configured to apply a voltage to the first and second proof mass driving beams so that the first and second values stay constant.

10. The acceleration sensor according to claim 3, further comprising:
  a force feedback circuit configured to apply a voltage to the first and second piezoelectric bending resonators so that the first and second values stay constant,
  wherein each of the first and second piezoelectric bending resonators have a fourth piezoelectric film and a seventh electrode further stacked in addition to the first electrode, the first piezoelectric film, and the second electrode, the first electrode and the second electrode being used for excitation and the second electrode and the seventh electrode being used for keeping the first and second values constant by generating expansion or contraction force in the extending direction of the first and second piezoelectric bending resonator.

\* \* \* \* \*